(12) United States Patent
Burge et al.

(10) Patent No.: US 7,995,964 B2
(45) Date of Patent: Aug. 9, 2011

(54) PERSONAL WIRELESS NETWORK CAPABILITIES-BASED TASK PORTION DISTRIBUTION

(75) Inventors: Benjamin D. Burge, Shaker Heights, OH (US); Ronald N. Isaac, Shrewsbury, MA (US); Joji Ueda, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 595 days.

(21) Appl. No.: 12/145,138

(22) Filed: Jun. 24, 2008

(65) Prior Publication Data

US 2009/0318074 A1 Dec. 24, 2009

(51) Int. Cl.
*H04B 5/00* (2006.01)
*H04B 7/00* (2006.01)
*H04W 4/00* (2009.01)

(52) U.S. Cl. .......... 455/41.1; 455/41.21; 455/426.1; 455/426.2; 455/41.3

(58) Field of Classification Search .......... 455/41.1, 455/41.2, 41.3, 426.1, 40, 426.2
See application file for complete search history.

(56) References Cited

U.S. PATENT DOCUMENTS

| | | | |
|---|---|---|---|
| 6,026,303 A | 2/2000 | Minamisawa | |
| 6,684,339 B1 | 1/2004 | Willig | |
| 6,834,192 B1 | 12/2004 | Watanabe et al. | |
| 6,928,264 B2* | 8/2005 | Botteck | 455/41.2 |
| 7,193,991 B2 | 3/2007 | Melpignano et al. | |
| 7,222,166 B2 | 5/2007 | Treister et al. | |
| 7,694,160 B2* | 4/2010 | Esliger et al. | 713/320 |
| 7,715,790 B1* | 5/2010 | Kennedy | 455/41.2 |
| 7,899,397 B2* | 3/2011 | Kumar | 455/41.2 |
| 2001/0012757 A1 | 8/2001 | Boyle | |
| 2003/0018696 A1 | 1/2003 | Sanchez et al. | |
| 2003/0054765 A1* | 3/2003 | Botteck | 455/41 |
| 2004/0044718 A1 | 3/2004 | Ferstl et al. | |
| 2004/0128382 A1 | 7/2004 | Shimoda et al. | |
| 2005/0033816 A1 | 2/2005 | Yamaguchi et al. | |
| 2005/0278520 A1 | 12/2005 | Hirai et al. | |
| 2006/0072525 A1* | 4/2006 | Hillyard et al. | 370/338 |
| 2006/0129637 A1 | 6/2006 | Yoshida | |
| 2006/0270395 A1* | 11/2006 | Dhawan et al. | 455/418 |
| 2007/0254728 A1 | 11/2007 | Moallemi et al. | |
| 2007/0294408 A1 | 12/2007 | Jackson | |

(Continued)

FOREIGN PATENT DOCUMENTS

EP 1548985 A1 6/2005

(Continued)

OTHER PUBLICATIONS

International Preliminary Report on Patentability dated Nov. 11, 2010 for PCT/US2009/038782.

(Continued)

*Primary Examiner* — Tilahun B Gesesse

(57) ABSTRACT

Where a plurality of personal portable devices communicating with each other through a personal wireless network are to cooperate to perform a task made up of a plurality of task portions, the task portions are automatically distributed among the personal portable devices at least partially in response to comparisons between the capabilities required to perform each task portion and the capabilities of each of the personal portable devices. In making such comparisons, the capabilities of each of the personal portable devices that are actually available for the performance of one or more of the task portions at the time such comparisons are made may be taken into account, and further, such comparisons may be repeated as the capabilities of each of the personal portable devices that are actually available change over time.

42 Claims, 12 Drawing Sheets

U.S. PATENT DOCUMENTS

2008/0043824 A1 2/2008 Jacobs et al.
2009/0275367 A1 11/2009 Reinisch et al.

FOREIGN PATENT DOCUMENTS

| EP | 1624628 A2 | 2/2006 |
|---|---|---|
| WO | 0103379 A1 | 1/2001 |
| WO | 03007552 A2 | 1/2003 |
| WO | 03084192 A1 | 10/2003 |
| WO | 2006028547 A1 | 3/2006 |
| WO | 2007121476 A1 | 10/2007 |
| WO | 2007127878 A1 | 11/2007 |

OTHER PUBLICATIONS

International Preliminary Report on Patentability dated Oct. 25, 2010 for PCT/US2009/039310.

International Preliminary Report on Patentability dated Jun. 10, 2010 for PCT/US2009/039309.

International Search Report and Written Opinion dated Aug. 20, 2009 for PCT/US2009/038782.

International Search Report and Written Opinion dated Sep. 15, 2009 for PCT/US2009/039309.

International Search Report and Written Opinion dated Aug. 21, 2009 for PCT/US2009/039310.

Basu et al., A Novel Approach for Execution of Distributed Tasks on Mobile Ad Hoc Networks, Wireless Communications and Networking Conference, 2002, IEEE, Piscataway, NJ, vol. 2, Mar. 17, 2002, pp. 579-585.

Duran-Limon et al., A Resource and QoS Management Framework for a Real-Time Event System in Mobile Ad Hoc Environments, Object-Oriented Real-Time Dependable Systems, 2003, The Ninth IEEE International Workshop on Anacapri, Italy, Piscataway, NJ, pp. 217-217.

Singh et al., Electing Leaders Based Upon Performance: the Delay Model, International Conference on Distributed Computing Systems, Arlington, TX, 1991, IEEE vol. Conf. 11, pp. 464-471.

Yen et al., A Genetic Algorithm for Energy-Efficient Based Multicast Routing on MANETS, Computer Communications, Elsevier Science Publishers BV, Amsterdam, NL, vol. 31, No. 10, 2008, pp. 2632-2641.

\* cited by examiner

PERSONAL WIRELESS NETWORK CAPABILITIES-BASED TASK PORTION DISTRIBUTION

FIELD

This description relates to automated distribution of portions of a task among multiple personal portable devices in a personal wireless network based on the relative abilities and limitations of each personal portable device.

BACKGROUND

It has become commonplace for people carry a multitude of personal portable devices capable of interacting in a personal wireless network (e.g., cell phones, PDAs, PIMs, MP3 players, PNDs, digital cameras, wireless headsets, wireless earpieces, wireless microphones, etc.) that they employ in combination to carry out a task where each device is assigned a portion of that task. Such tasks include listening to music, watching a video, engaging in a telephone conversation, reading emails, exchanging text messages, entering data, editing data, printing data, etc. Such personal portable devices are meant to be easily movable from place to place by being easily carried on the persons of their users in some way (e.g., in a pocket, strapped to an arm or wrist, worn over the head, suspended from a neck strap or shoulder strap, clipped to a belt or lapel, etc.).

It has also become commonplace for people to obtain different personal portable devices from different vendors employing different generations of various technologies and to rely on widely-accepted standards of wireless communications to enable their different personal portable devices to interact. As those skilled in the art will readily recognize, technologies in the areas of audio and visual communications are quickly evolving and accepted standards in the encoding, transmission and encryption of audio/visual data are also quickly evolving. As a result, it is not uncommon for a user to acquire different personal portable devices capable of overlapping audio/visual functions, but each implementing those functions in a manner that adheres to different generations of a standard or each implementing those functions in a manner that adheres to competing standards.

By way of example, depending on the choice of media by which a user receives a piece of audio/visual data, the audio may be encoded in Dolby Digital, Dolby Surround, MLP, Dolby DTS, Audio MPEG, MP3, WMA, or any of a variety of other encoding formats. To be so easily carried on a user's person, the physical size and weight of such devices is usually kept to a minimum, which necessarily restricts choices of electronic components within such devices to those that are physically smaller in size, that consume electrical power at a lesser rate, and that dissipate a lesser proportion of electrical energy as heat. Such restrictions often require various compromises in design choices, such as a physically smaller battery, a slower processor, a lesser data storage capacity, and input/output components accommodating a slower maximum rate of data throughput.

As a result, such personal portable devices are often limited in the complexity of the tasks and/or portions of tasks that they are able to perform. Complex tasks often require the execution of larger sequences of instructions of larger routines at faster rates and/or the storage and processing of larger quantities of data. This often necessitates a greater memory storage capacity, a larger rate of electric power consumption, a greater amount of heat dissipation and/or a higher rate of data throughput than can be accommodated by at least some personal portable devices in which one or more of the above compromises in design choices have been made.

SUMMARY

Where a plurality of personal portable devices communicating with each other through a personal wireless network are to cooperate to perform a task made up of a plurality of task portions, the task portions are automatically distributed among the personal portable devices at least partially in response to comparisons between the capabilities required to perform each task portion and the capabilities of each of the personal portable devices. In making such comparisons, the capabilities of each of the personal portable devices that are actually available for the performance of one or more of the task portions at the time such comparisons are made may be taken into account, and further, such comparisons may be repeated as the capabilities of each of the personal portable devices that are actually available change over time.

In one aspect, a first personal portable device cooperates with at least a second personal portable device through a wireless network to perform a task comprising a plurality of task portions. The first personal portable device comprises a first wireless transceiver to enable communications across the wireless network with the second personal portable device, a first processor, and a first storage in which is stored a first assignment routine comprising a sequence of instructions. When the sequence of instructions is executed by the first processor, the first processor is caused to retrieve a first requirements data indicating a capability required to execute a first task routine to perform a first task portion of the plurality of task portions, a second requirements data indicating a capability required to execute a second task routine to perform a second task portion of the plurality of task portions, and a first capabilities data indicating a capability of the first personal portable device to execute a routine; operate the first wireless transceiver to signal the second personal portable device through the wireless network to retrieve a second capabilities data indicating a capability of the second personal portable device to execute a routine; derive a first distribution of assignments of performances of the first and second task portions among the first and second personal portable devices in response to comparing the first requirements data to the first and second capabilities data and in response to comparing the second requirements data to the first and second capabilities data, wherein the first task portion is assigned to be performed by the first personal portable device such that the first processor is assigned to execute the first routine and the second task portion is assigned to be performed by the second personal portable device such that a second processor of the second personal portable device is assigned to execute the second routine; and operate the first wireless transceiver to signal the second personal portable device through the wireless network with an indication that the second personal portable device is assigned to execute the second task routine.

Implementations may include, and are not limited to, one or more of the following features. The first and/or second capabilities data may indicate a degree to which a capability of the first and/or second personal portable device remains available for executing a routine as a result of that capability being at least partially utilized in executing another task. The first assignment routine may cause the first processor to detect a change in that degree, and to derive a second distribution of assignments of performance of the first and second task portions among the first and second personal portable devices in response to that change. The first personal portable device may further comprise an interactive component having a manually-operable control to enable a user to signal for the personal portable devices to cooperate to perform the task. The capability indicated by the first requirements data, the second requirements data, the first capabilities data and/or the second capabilities data may be an amount of storage, a level of processor throughput, a level of network throughput or a user interaction capability. In being caused to derive the first distribution and/or a subsequent distribution, the first processor may either be caused to determine which of the first and second personal portable devices stores a task data needed to perform the task; or be caused to compare version levels of the first task routine and another task routine that also corresponds to the first task portion, and to select either the first or the other task routine at least partially based on which has the later version level. The first distribution may require that the first and/or second task routines be copied between the first and second personal portable devices, and the deriving the first distribution may require the first processor to determine either whether such copying is permissible in view of a licensing restriction or whether such a copied routine would be compatible with one or the other of the first and second processors.

In one aspect, a method is for distributing a first task portion and a second task portion of a task among a first personal portable device and a second personal portable device. The method comprises awaiting an indication from an operator of the first and second personal portable devices for the first and second personal portable devices to cooperate through a wireless network to perform the task; retrieving a first requirements data indicating a capability required to perform the first task portion, a second requirements data indicating a capability required to perform the second task portion, a first capabilities data indicating a capability of the first personal portable device, and a second capabilities data indicating a capability of the second personal portable device; deriving a first distribution of assignments of performances of the first and second task portions among the first and second personal portable devices in response to comparing the first requirements data to the first and second capabilities data and in response to comparing the second requirements data to the first and second capabilities data, wherein the first task portion is assigned to be performed by the first personal portable device and the second task portion is assigned to be performed by the second personal portable device; and transmitting a signal from one of the first and second personal portable devices with an indication of the first distribution of assignments to the other of the first and second personal portable devices through the wireless network.

Implementations may include, and are not limited to, one or more of the following features. The method may further comprise retrieving at least one of the first and second requirements data and/or at least one of the first and second capabilities data through the wireless network. The first and/or second capabilities data may indicate a degree to which a capability of the first and/or second personal portable device remains available for executing a routine as a result of that capability being at least partially utilized in executing another task. The method may further comprise detecting a change in that degree, and deriving a second distribution of assignments of performance of the first and second task portions among the first and second personal portable devices in response to that change. The first personal portable device may comprise a first processor that retrieves a first task routine from a storage of the first personal portable device and executes the first task routine to perform the first task portion, and/or the second personal portable device may comprise a second processor that retrieves a second task routine from a storage of the second personal portable device and executes the second task routine to perform the second task portion. Awaiting an indication from an operator may comprise awaiting detection of the operation of a manually-operable control of one or both of the first and second personal portable devices. The capability indicated by the first requirements data, the second requirements data, the first capabilities data and/or the second capabilities data may be an amount of storage, a level of processor throughput, a level of network throughput or a user interaction capability. Comparing the first requirements data to the first and second capabilities data may comprise comparing requirements to execute the first task routine to capabilities of the first and second personal portable devices to execute routines, and comparing the second requirements data to the first and second capabilities data may comprise comparing requirements to execute the second task routine to capabilities of the first and second personal portable devices to execute routines. Derive the first distribution and/or a subsequent distribution may comprise determining which of the first and second personal portable devices stores a task data needed to perform the task; or may comprise comparing version levels of the first task routine and another task routine that also corresponds to the first task portion, and selecting either the first or the other task routine at least partially based on which has the later version level. The first distribution may require that the first and/or second task routines be copied between the first and second personal portable devices, and the deriving the first distribution may require the first processor to determine either whether such copying is permissible in view of a licensing restriction or whether such a copied routine would be compatible with one or the other of the first and second processors.

Alternatively and/or additionally, implementations may include, and are not limited to, one or more of the following features. The method may further comprise transmitting a first audio data between the first and second personal portable devices, and audibly outputting at least a first portion of the first audio data. The first and second personal portable devices may cooperate with a third personal portable device through the wireless network to perform the task, the wireless network may be of a chain topography with the third personal portable device at an endpoint of that chain topography, and the method may further comprise retrieving a third capabilities data indicating a capability of the third personal portable device and/or a third requirements data indicating a capability required to perform a third task portion of the task. The method may further comprise retransmitting either the first portion of the first audio to the third personal portable device to enable the third personal portable device to audibly output the first portion along together with either the first or second personal portable devices, or a second portion of the first audio to the third personal portable device to enable the third personal portable device to audibly output the second portion substantially simultaneously to either the first or second personal portable device audibly outputting the first portion. The method may further comprise transmitting at least a portion of a second audio detected by a microphone of the second personal portable device to the first personal portable device through the wireless network.

DESCRIPTION OF DRAWINGS

FIG. 4b is a perspective diagram depicting a more specific example of the change in distribution of task portions of FIG. 4a.

FIG. 4c is a block diagram depicting a different change in distribution of task portions among the personal portable devices in the network of FIG. 4a.

DESCRIPTION

Figure 1A:
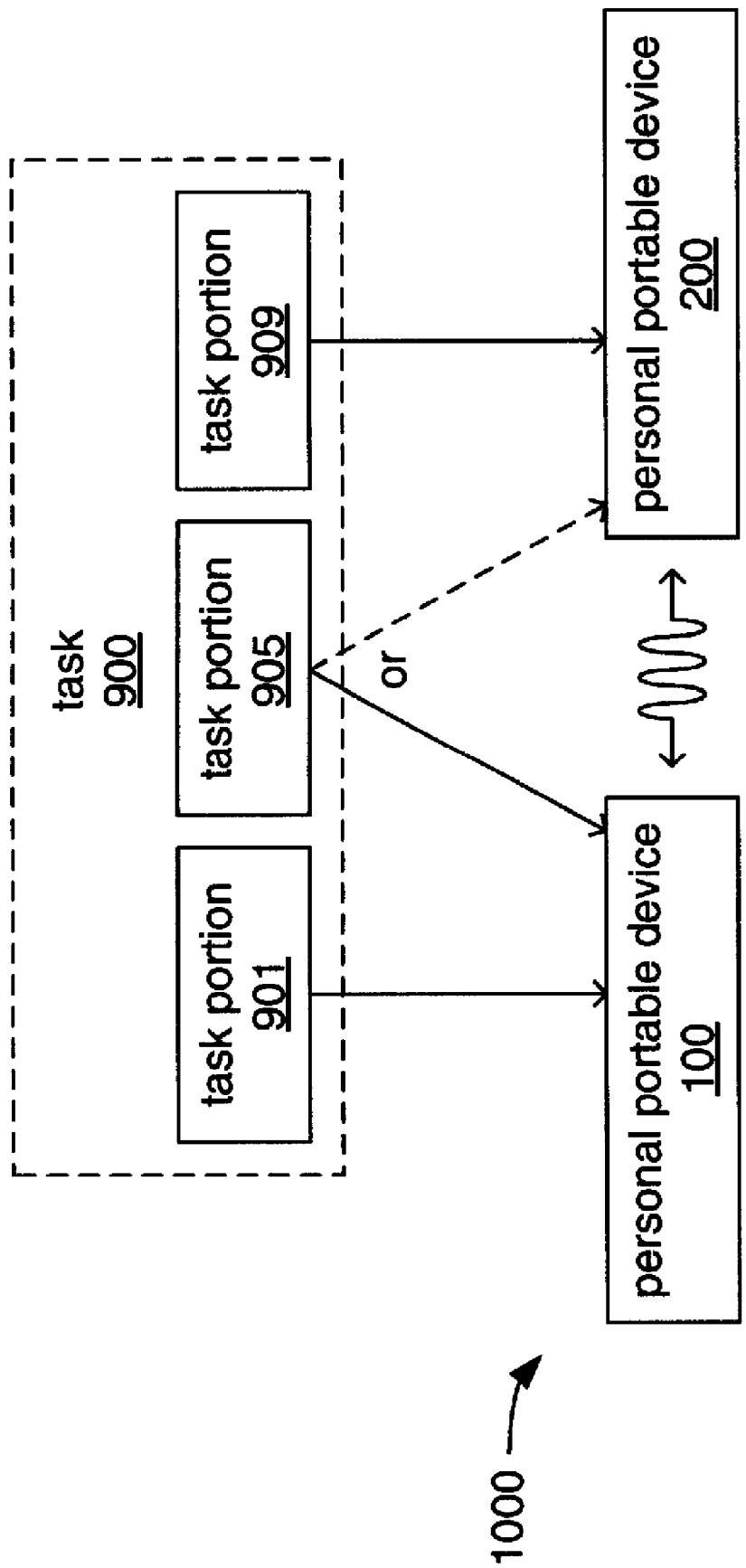
FIG. 1a is a block diagram depicting a distribution of task portions among two personal portable devices in a network.
Figure 1B:
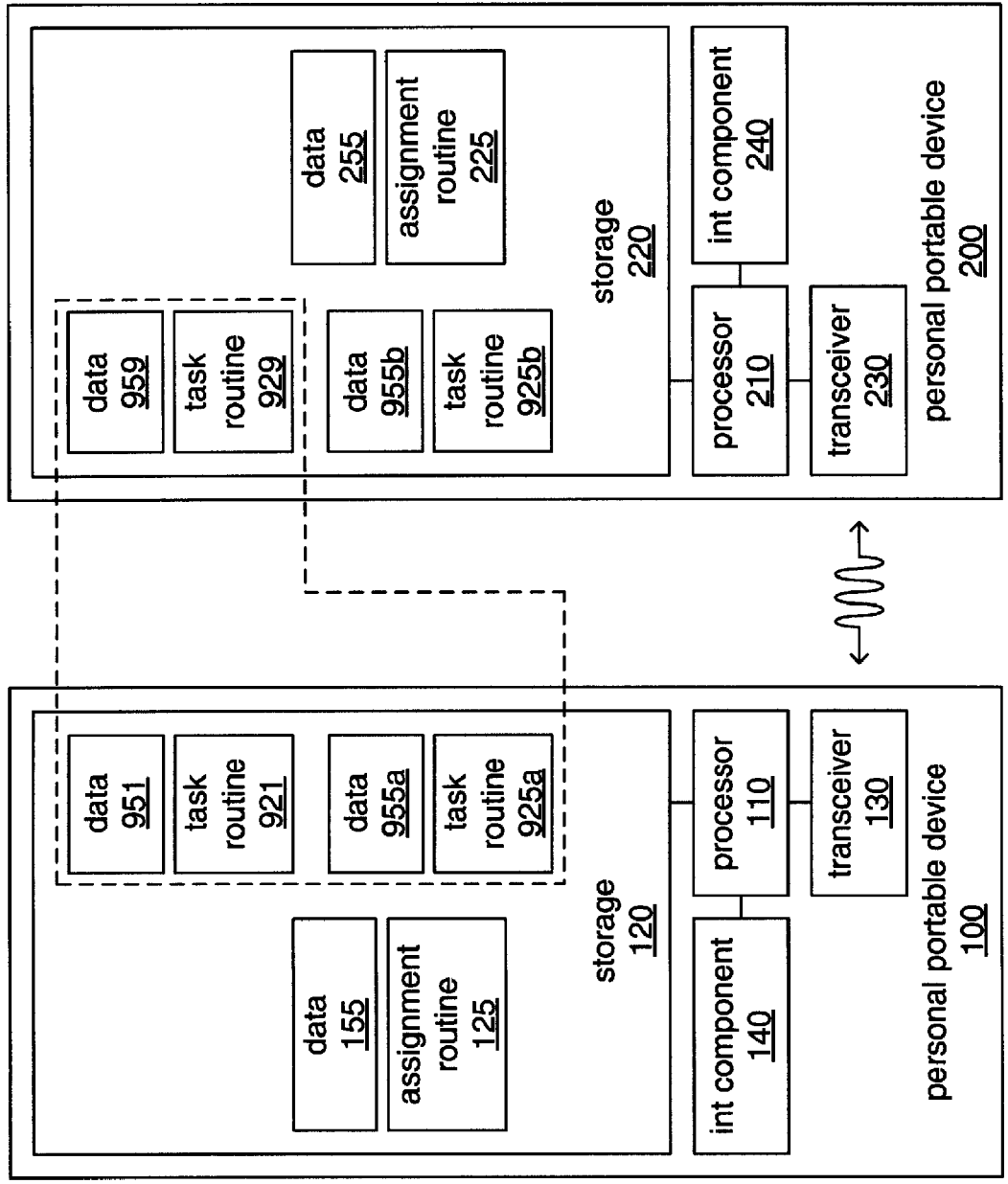
FIG. 1b is a block diagram of internal architectures of the two personal portable devices of the network of FIG. 1a depicting a corresponding distribution of assignments of execution of task routines among the two personal portable devices.

FIGS. 1a and 1b are block diagrams that, taken together, depict the manner in which a personal portable device 100 and a personal portable device 200 wirelessly linked in a network 1000 cooperate to perform a task 900. FIG. 1a depicts the division of the task 900 into task portions 901, 905 and 909, and how these task portions are distributed among the personal portable devices 100 and 200. FIG. 1b depicts aspects of possible internal architectures of the personal portable devices 100 and 200, and how the distribution of task portions depicted in FIG. 1a corresponds to a possible distribution of assignments of execution of task routines and use of data among the personal portable devices 100 and 200.

Each of the personal portable devices 100 and 200 may be any of a variety of types personal portable device, including and not limited to, a personal data assistant (PDA), a personal information manager (PIM), a personal navigation devices (PND), a cellular telephone, a MP3 audio file player, a MPEG video file player, a digital camera, a wireless headset, a wireless earpiece, and a wireless microphone. The nature of the task 900 that the personal portable devices 100 and 200 cooperate to perform necessarily depends on the capabilities of each of the personal portable devices 100 and 200. By way of example, the personal portable devices 100 and 200 may be a cellular telephone and a wireless in-ear headset, respectively, and the task 900 may be the playing of recorded audio stored on the personal portable device 100 through the personal portable device 200. By way of another example, the personal portable devices 100 and 200 may be a wireless data storage device and a wireless data terminal, respectively, and the task 900 may be the searching and editing of data stored on the personal portable device 100 by a user controlling the search and making the edits through the personal portable device 200. In both cases, the perspective of a user of both of the personal portable devices 100 and 200 may be that a single task is being performed. However, those skilled in the art will readily recognize that what may appear to a user to simply be a single task (e.g., the task 900) often involves multiple subtasks, or portions of the task (e.g., the task portions 901, 905 and 909), that must each be performed for the task to be performed.

The personal portable device 100 incorporates a processor 110, a storage 120, a transceiver 130 and an interactive component 140. The processor 110 has access to the storage 120 to access various routines and data, has access to the transceiver 130 to engage in wireless communications, and has access to the interactive component 140 to enable interaction between the personal portable device 100 and a user. Similarly, the personal portable device 200 incorporates a processor 210, a storage 220, a transceiver 230 and an interactive component 240. The processor 210 has access to the storage 220 to access various routines and data, has access to the transceiver 230 to engage in wireless communications, and has access to the interactive component 240 to enable interaction between the personal portable device 200 and a user.

Each of the storages 120 and 220 may be based on any of a wide variety of information storage technologies, including and not limited to, static RAM, dynamic RAM, ROM of either erasable or non-erasable form, FLASH, magnetic memory, ferromagnetic disk storage, phase-change storage or magneto-optical storage. Each of the storages 120 and 220 are able to store varying quantities and types of routines and data to be accessed by the processors 110 and 210, respectively. The storage 120 stores at least task routines 921 and 925a in addition to storing an assignment routine 125, and the storage 220 stores at least task routines 925b and 929 in addition to possibly storing an assignment routine 225. Each of the routines 125, 225, 921, 925a, 925b and 929 (i.e., both task and assignment routines) may be accompanied by data 155, 255, 951, 955a, 955b and 959, respectively. It is preferred that the storages 120 and 220 be at least partially based on some form of non-volatile storage technology to prevent the loss of at least some of their contents when deprived of power.

Each of the transceivers 130 and 230 may employ any of a number of wireless communications technologies to enable wireless communications between the personal portable devices 100 and 200, and thereby enable the formation of the network 1000. Such technologies by which formation of the network 1000 may be enabled include and are not limited to infrared, ultrasound, skin conductance, and radio frequency (RF) signals. Where RF signals are employed, the frequencies of those signals and various aspects of the protocols and the transfers of commands and data may be selected to conform to any of a variety of wireless networking standards, including and not limited to, the Bluetooth specification promulgated by the Bluetooth Special Interest Group of Bellevue, Wash., and/or one of the variety of forms of wireless local area network (WLAN) promulgated by the Institute of Electrical and Electronics Engineers, Inc. (IEEE®) of Piscataway, N.J., in at least the IEEE 802 series of standards. Regardless of the exact nature of the technology or standards employed in the communications between the personal portable devices 100 and 200 via the transceivers 130 and 230, such communications enable coordination between the personal portable devices 100 and 200 in the performance of their assigned task portions of the task 900 as the personal portable devices 100 and 200 cooperate to perform the task 900.

Each of the interactive components 140 and 240 may be any of a variety of types of component enabling a user to interact with the personal portable devices 100 and 200, respectively. Such possible component include, and are not limited to, buttons, switches, touch sensors, capacitance-based proximity sensors, indicator lamps, alphanumeric displays, video displays, acoustic drivers, microphones, and temperature sensors. Types of interactions with a user that may be supported by one or both of the interactive components 140 and 240 include, and are not limited to, detecting user input through manual operation of controls, detecting user-spoken audio for recordation and/or transmission to another personal portable device, audibly outputting audio from an audio recording and/or received from another personal portable device, and capturing or displaying visual imagery. The type of component for each of the interactive components 140 and 240 is necessarily linked to what type of device each of the personal portable devices 100 and 200 are. By way of example, where the personal portable device 100 is a cellular telephone, then the interactive component 140 is necessarily at least a combination of manually-operable controls, a visual display, a microphone and an acoustic driver to enable a user of the personal portable device 100 to dial a phone number, view status information regarding a phone conversation, and both talk to and hear another person in a phone conversation. By way of another example, where the personal portable device 200 is a wireless earphone, the interactive component 240 is necessarily at least an acoustic driver to audibly output whatever audio the user of the personal portable device 200 is listening to, and may further be a manually-operable control to adjust the volume or other characteristic of that audible output.

Each of the processors 110 and 210 may be any of a variety of types of processing device, including and not limited to, a general purpose processor, a digital signal processor or other more specialized processor having a limited instruction set optimized for a given range of functions, a microcontroller or combinational logic. The processor 110 is able to access in the storage 120 each of the assignment routine 125 and the task routines 921 and 925a to retrieve sequences of instructions that when executed by the processor 110, cause the processor 110 to perform various tasks, as will be described. Similarly, the processor 210 is able to access in the storage 220 each of the assignment routine 225 and the task routines 925b and 929 to also retrieve sequences of instructions that when executed by the processor 210, cause the processor 210 to perform various tasks, as will be similarly described.

As previously discussed, the task 900 is divided into the task portions 901, 905 and 909, and these task portions are distributed among the personal portable devices 100 and 200, which employ the network 1000 of which they are each a part to coordinate their separate performances of the ones of these task portions that are assigned to each of them. In this way, the personal portable devices 100 and 200 cooperate to perform the task 900 as directed by the user of the personal portable devices 100 and 200. As depicted in FIG. 1a, the task portions 901 and 905 are assigned to the personal portable device 100, and the task portion 909 is assigned to the personal portable device 200. It should be noted that the task portion 901 corresponds to the task routine 921, the task portion 905 corresponds to either of the task routines 925a or 925b, and the task portion 909 corresponds to the task routine 929. Therefore, the distribution of task portions depicted in FIG. 1a results in the corresponding distribution of assignments of execution of routines depicted in FIG. 1a in which the processor 110 is assigned to execute the task routines 921 and 925a, and of the processor 210 is assigned to execute the task routine 929, while the task routine 925b is not executed.

The distribution of task portions depicted in FIG. 1a and the corresponding distribution of assignments of execution of routines depicted in FIG. 1b are derived based on the relative capabilities of the personal portable devices 100 and 200 to perform each of the task portions 901, 905 and 909. In determining such relative abilities, various factors are evaluated, including and not limited to, the storage capacities and processing throughputs required to execute each task routine, the storage capacities of the storages 120 and 220, the processing throughputs of the processors 110 and 210, the network data transfer rates required to execute each task routine, the data transfer capacities of the transceivers 130 and 230, the user interactions required to execute each task routine, the user interaction capabilities of the interactive components 140 and 240, which of the storages 120 and 220 contains required routines and/or data, whether or not required routines and/or data are able to be copied between the storages 120 and 220, and relative capabilities and/or version levels of different routines where there is more than one routine is available to choose from to perform a particular task portion. In some embodiments, the derivation of a distribution of the task portions of the task 900 among the personal portable devices 100 and 200 may be caused to be performed by only one or the other of the processors 110 and 210 as a result of executing a sequence of instructions of one or the other of the assignment routines 125 and 225, respectively. In other embodiments, the processors 110 and 210 are caused by the execution of the assignment routines 125 and 225, respectively, to cooperate in deriving a distribution of task portions.

As part of deriving a distribution of the task portions of the task 900, information concerning what task portions make up the task 900 must be retrieved, along with what task routines corresponding to each of those task portions are stored within each of the storages 110 and 210 of the personal portable devices 100 and 200, respectively. In essence, when a user of the personal portable devices 100 and 200 commands the personal portable devices 100 and 200 to cooperate to perform the task 900, information must be retrieved that indicates what task portions must be performed in order to perform the task 900. Upon retrieving information indicating that the task portions 901, 905 and 909 are the task portions that make up the task 900, requirements data providing information concerning the various requirements of each of the task routines corresponding to each of the portions 901, 905 and 909 must be retrieved. In some embodiments, one or both of the data 155 and 255 associated with the assignment routines 125 and 225, respectively, may include requirements data providing such information. In other embodiments, one or more of the data 951, 955a, 955b and 959 associated with the task routines 921, 925a, 925b and 929, respectively, may provide such information. In still other embodiments, requirements data providing such information about each of the task routines 921, 925a, 925b and 929 may be directly incorporated into each of these task routines. Also, capabilities data providing information concerning the various capabilities of each of the personal portable devices 100 and 200 must be retrieved, and in some embodiments, one or both of the data 155 and 255 may include such information. Further, information must be retrieved concerning what capabilities of each of the personal portable devices are already committed to support the execution of other routines unrelated to the task 900 such that those capabilities may be partially or entirely unavailable to one or more task routines related to the task 900. In some embodiments, the capabilities data may provide this information concerning what capabilities are actually available at a given time in view of what capabilities have been committed elsewhere in lieu of providing information concerning capabilities that would be available if none were committed elsewhere.

In some embodiments, at least some of such information may take the form of Boolean values that each indicate whether or not a given task routine requires that a given personal portable device have a particular capability and/or Boolean values that each indicate whether or not a given personal portable device has that given capability (or whether or not that given capability is available at that time). By way of example, such information concerning a given task routine may indicate whether or not the given task routine requires a keypad that enables a user to enter text, and corresponding information concerning a given personal portable device may indicate whether or not the given personal portable device has such a keypad and/or whether or not such a keypad is available at that time. Additionally and/or alternatively, such information may take the form of rating values that each indicate a level of a particular capability required by a given task routine and/or a level of that particular capability provided by or available from a given personal portable device. By way of example, such information concerning a given task routine may indicate a particular minimum level of processing throughput to be executed, and corresponding information concerning a given personal portable device may indicate a particular maximum possible level of processing throughput for executing a routine of whatever type and/or a maximum available level. As those skilled in the art will readily recognize, ratings of such things as a processor's throughput or of the minimum throughput required to execute a routine may necessarily be approximations, since any of a wide variety of conditions in place at any given time during the execution of a given routine by a given processor may result in greater or lesser processing throughput being available from that processor for the execution of that routine.

Upon retrieving at least some of the aforementioned information, the derivation of a distribution of the task portions 901, 905 and 909 entails determining what distributions of these task portions are possible in view of that information. In some embodiments, this entails comparing each of the requirements data indicating capabilities required by each of the task routines to each of the capabilities data indicating what capabilities are potentially and/or actually available from each of the personal portable devices 100 and 200. By way of example, where a given task routine requires a keypad that enables a user to enter text and where a given personal portable device provides such a keypad, then the task portion corresponding to that task routine may be assigned to be performed by that personal portable device. In other embodiments, this entails comparing rating values indicating a level of a capability required by a given task routine to rating values indicating a level of that capability provided by each personal portable device. By way of example, where a given task routine requires a particular minimum level of processing throughput and where a given personal portable device is able to provide that level of processing throughput, then the task portion corresponding to that task routine may be assigned to be performed by that personal portable device.

However, as those skilled in the art will readily recognize, other factors may limit what distributions of task portions are possible, despite whatever capabilities may be provided by each of the personal portable devices 100 and 200. Further information may need to be retrieved and employed in determining what distributions of task portions are possible, including information concerning where each task routine corresponding to each task portion is stored, whether or not each task routine is able to be copied and/or transferred between the personal portable devices 100 and 200, and which of the processors 110 and 210 is each task routine compatible with. By way of example, whether a task routine corresponding to a given task portion is stored in one or other of the storages 120 or 220 may be determinative of which of the personal portable devices is assigned to perform that task portion if that task cannot be copied and/or transferred between the storages 120 and 220 either due to limits in storage capacity or due to limits imposed by a licensing agreement associated with that task routine. Similarly, whether a task routine corresponding to a given task portion is incompatible with one or the other of the processors 110 and 210 such that one of the processors 110 and 210 is unable to execute a sequence of instructions of that task routine. In some embodiments, information concerning processor compatibility and/or limitations on copying or transfer may either be included within one or more of the data 155, 255, 951, 955$a$, 955$b$ and 959, or be embedded within one or more of the task routines 921, 925$a$, 925$b$ and 929.

Along with determining what distributions of the task portions 901, 905 and 909 are possible, the derivation of a distribution may entail determining which distribution is preferred from what may be multiple distributions that are determined to be possible. Where multiple distributions of the task portions 901, 905 and 909 are determined to be possible, one distribution may be determined to be preferred over another based on one or more factors, including and not limited to, the comparative number of features enabled, relative version levels of different task routines, and efficiency in usage of capabilities provided by the personal portable devices 100 and 200. By way of example, one distribution that results in a given task portion being assigned to one personal portable device that is able to perform that task portion while providing a user with a greater degree of control over that performance may be determined to be preferred over another distribution that results in that task portion being assigned to another personal portable device that is not able to provide the user with as much of a degree of control. This may be because one personal portable device is able to provide a user interface that affords the user the opportunity to control more of the settings employed in performing that task portion. By way of another example, one distribution that results in a given task portion being assigned to one personal portable device that has a task routine stored within it that is a more recent version than an analogous task routine stored within another personal portable device may be preferred over another distribution that results in that task portion being assigned to that other personal portable device. As those skilled in the art will readily recognize, new versions of routines to perform a given function are usually created to address shortcomings of earlier versions, and so the use of a more recent versions is often desirable, where possible. By way of still another example, one distribution that results in a given task portion being assigned to one personal portable device that is able to perform the task portion more efficiently may be preferred over another distribution that results in that task portion being assigned to another personal portable device that is not able to perform that task portion as efficiently. As those skilled in the art will readily recognize, internal architectures of some electronic devices may incorporate specialized processing components that are able to perform a given function while using less storage capacity, data throughput and/or other resources than other electronic devices having internal architectures not incorporating such specialized processing components.

As has already been discussed, the distribution of the task portions 901, 905 and 909 depicted in FIG. 1$a$, results in the processor 110 being assigned to execute sequences of instructions of the task routines 921 and 925a, and the processor 210 being assigned to execute a sequence of instructions of the task routine 929, as depicted in FIG. 1b. As also depicted in FIG. 1b, sequences of instructions of the task routine 925b are not executed. As has been discussed, and as indicated in FIG. 1a with a dashed arrow, at least one alternative distribution was possible in which the task portion 905 might have been assigned to performed by the personal portable device 200, instead of by the personal portable device 100. The exact manner in which the distribution depicted in FIG. 1a (versus such alternatives) was derived may vary greatly depending on a wide variety of possible circumstances, including the nature of the task 900 and the capabilities of the personal portable devices 100 and 200.

By way of example, it may be that this depicted distribution of task portions (and accompanying distribution of assignments to execute task routines) was determined to be the only distribution possible. It may be that the processor 210 did not have sufficient processing throughput available to execute both of the task routines 925b and 929, while the processor 110 did have sufficient available processing throughput to execute the task routines 921 and 925a. Or, it may be that the storage 220 does not have sufficient available capacity to accommodate possible size of the data 955b associated with the task routine 925b that might be expected to occur during execution of the task routine 925b. Since, either of the task routines 925a and 925b could have been selected to cause the performance of the task portion 905, the depicted distribution may have been derived as a result of it being possible to execute the task routine 925a, but not the task routine 925b. Alternatively and by way of another example, it may be that this depicted distribution of task portions was determined to be preferably despite one or more other distributions (including one or more distributions resulting in the task routine 925b being executed) being possible. Execution of the task routine 925a may be preferable over execution of the task routine 925b as a result of the task routine 925a being a newer version, or the task routine 925a providing a greater degree of user control, or the task routine 925a employing a specialized feature of the internal architecture of the personal portable device 200 that would have enabled more efficient performance of the task portion 905.

Figure 2A:
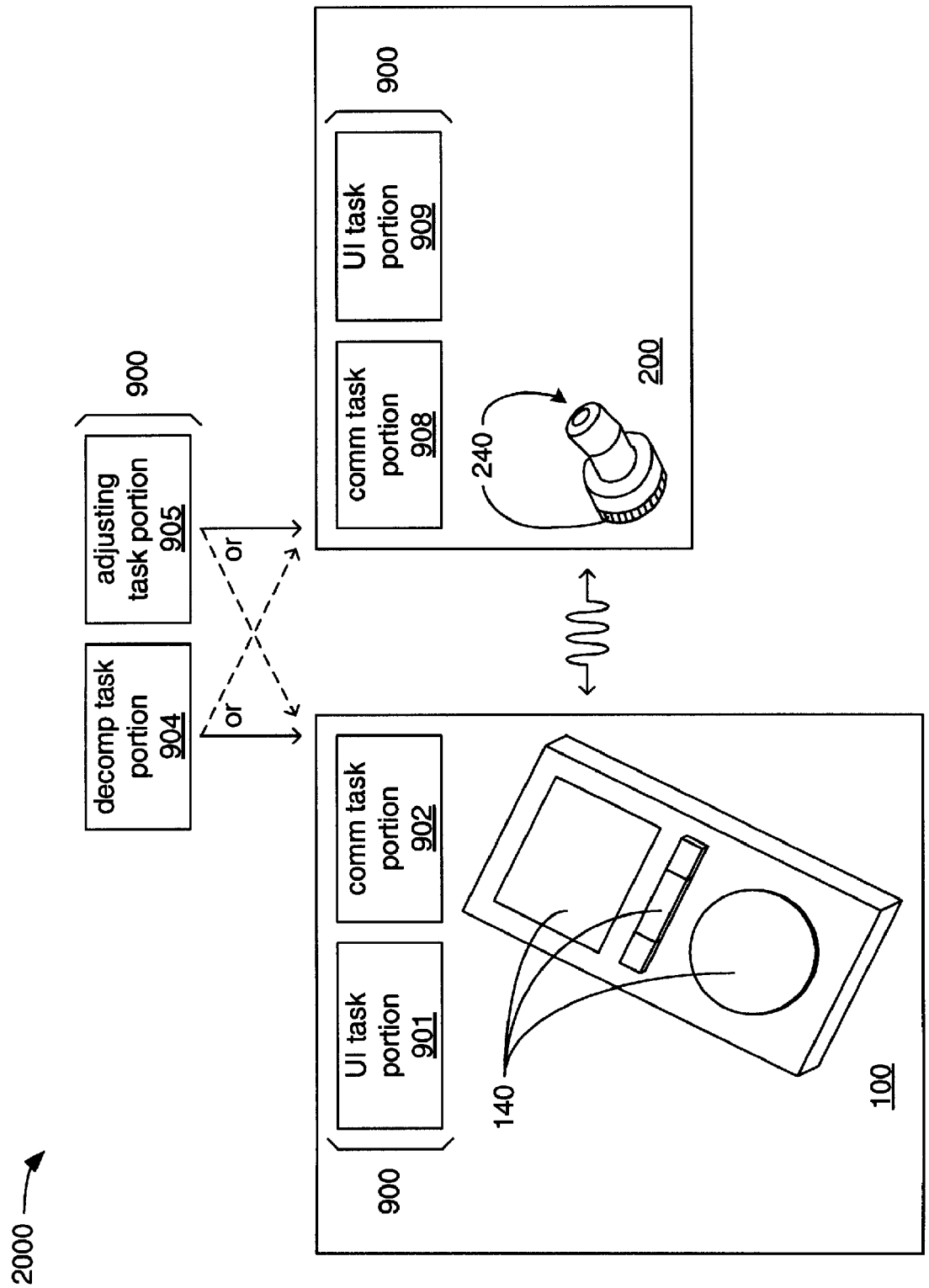
FIG. 2a is a block diagram depicting a distribution of task portions among two personal portable devices in another network.
Figure 2B:
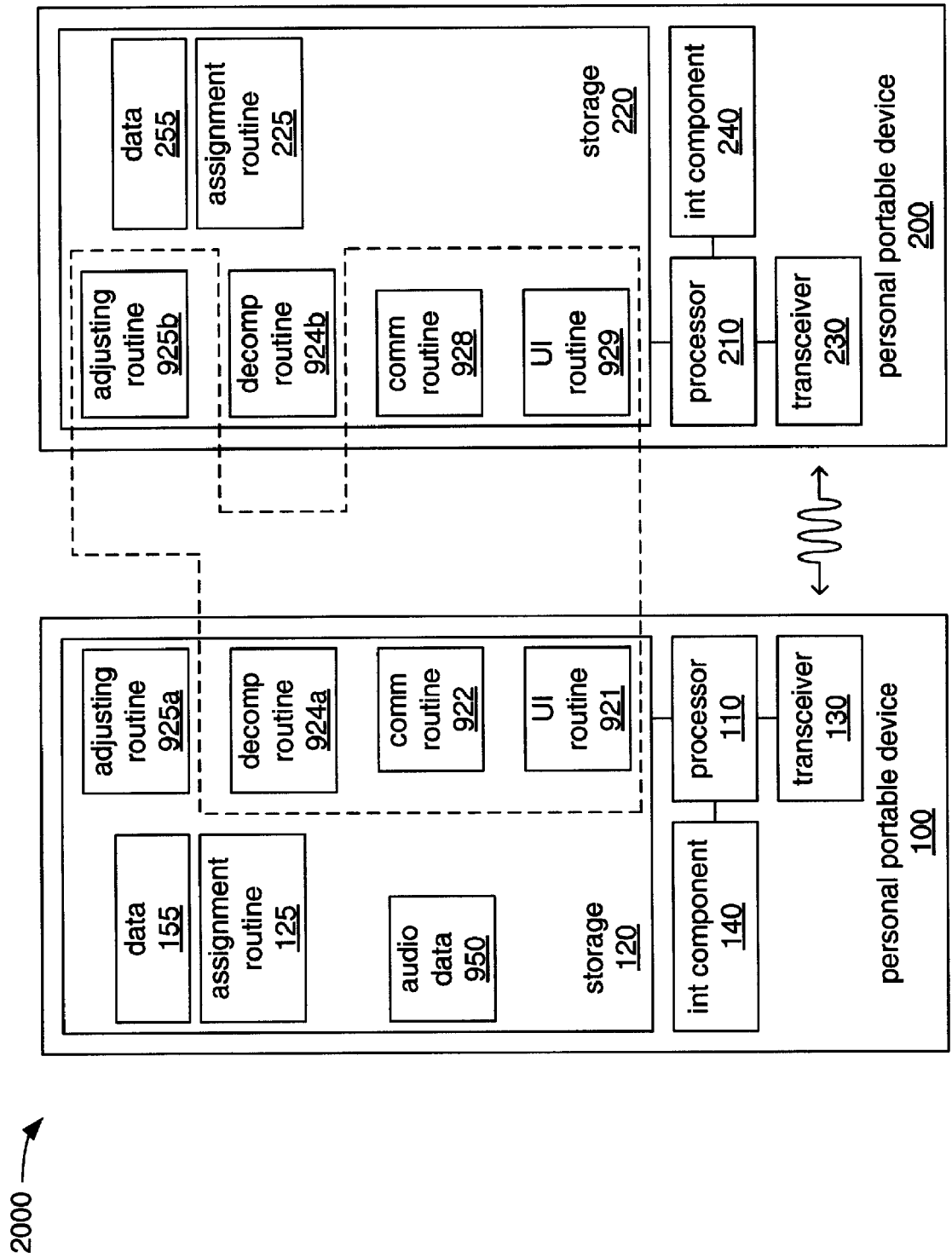
FIG. 2b is a block diagram of internal architectures of the two personal portable devices of the network of FIG. 2a depicting a corresponding distribution of assignments of execution of task routines among the two personal portable devices.

FIGS. 2a and 2b are block diagrams that, taken together, depict the manner in which a personal portable device 100 and a personal portable device 200 wirelessly linked in a network 2000 cooperate to perform a task 900 of audibly outputting audio stored as an audio data 950 within the personal portable device 100 through the personal portable device 200. The personal portable devices 100 and 200 also cooperate to assign portions of the task 900 at least partly in response to relative capabilities of the personal portable devices 100 and 200. FIG. 2a depicts the division of the task 900 into various task portions, and how these task portions are distributed among the personal portable devices 100 and 200. FIG. 2b depicts aspects of possible internal architectures of the personal portable devices 100 and 200, and how possible distributions of assignments of task portions correspond to possible distributions of assignments of execution of task routines among the personal portable devices 100 and 200.

Each of the personal portable devices 100 and 200 may be any of a variety of possible forms of personal portable device. However, the FIGS. 2a and 2b and the discussion that follows are meant to provide a more specific example of assigning portions of a more specific task between more specific forms of the personal portable devices 100 and 200 than were discussed in more general terms with regard to the personal portable devices 100 and 200 of FIGS. 1a and 1b. Therefore, as depicted, the personal portable device 100 is a hand-holdable device appropriate for storing audio data (e.g., a MP3 file player, a MPEG video file player, a digital camera, etc.), and the personal portable device 200 is a device in the form of an earpiece that is appropriate for audibly outputting audio provided by the personal portable device 100 (e.g., a wireless "ear bud") to a user's ear. Due to numerous correspondences of features between FIGS. 1a and 1b, and FIGS. 2a and 2b, numerous identical numeric labels have been used.

Not unlike the personal portable device 100 of FIGS. 1a and 1b, the personal portable device 100 of FIGS. 2a and 2b incorporates a storage 120, a transceiver 130 and an interactive component 140, one or more of which are accessible by a processor 110 also incorporated into the personal portable device 100. Similarly, not unlike the personal portable device 200 of FIGS. 1a and 1b, the personal portable device 200 of FIGS. 2a and 2b incorporates a storage 220, a transceiver 230 and an interactive component 240, one or more of which are accessible by a processor 210 also incorporated into the personal portable device 200. Again, each of the processors 110 and 210, the storages 120 and 220, the transceivers 130 and 230, and the interactive components 140 and 240 may be based on any of a variety of technologies. However, in embodiments in which the personal portable device 100 is of a form appropriate for storing audio data (e.g., the audio data 950), and in which the personal portable device 200 is of a form appropriate for audibly outputting audio, the interactive component 140 likely incorporates at least one manually-operable control and possibly a visual display to enable selection of audio data, and the interactive component 240 likely incorporates at least one acoustic driver to enable audible output.

In a manner not unlike the task 900 of FIGS. 1a and 1b, the task 900 of FIGS. 2a and 2b of audibly outputting the audio data 950 stored in the storage 120 of the personal portable device 100 through an acoustic driver of the interactive component 240 of the personal portable device 200 is divided up into multiple task portions, including a user interface task portion 901, a communications task portion 902, a decompression task portion 904, an adjusting task portion 905, a communications task portion 908 and a user interface task portion 909. The user interface tasks portions 901 and 909 entail receiving user input from the user's operation of manually-operable controls of the interactive components 140 and/or 240, and providing the user with visibly and/or audibly perceptible indications of the operation of the personal portable devices 100 and 200 in their cooperation to perform the task 900. The communications task portions 902 and 908 entail the exchange of commands and/or data between the personal portable devices 100 and 200 through the network 2000. The decompression task portion 904 entails the decompression of compressed audio stored as the audio data 950. The decompression task portion 904 may further entail selecting and/or decoding one or more audio channels in response to information concerning various characteristics of the one or more acoustic drivers of the interactive component 240. The adjusting task portion 905 entails adjusting one or more characteristics of the decompressed form of the audio data 950, including and not limited to, bass, treble, balance, and volume. The adjusting task portion 905 may further entail adjusting such characteristics in response to user input received in the course of performing one or the other of the user interface task portions 901 and 909.

In a manner not unlike the task portions and task routines assigned to the personal portable devices 100 and 200 in FIGS. 1a and 1b, among the personal portable devices 100 and 200 of FIGS. 2*a* and 2*b*, there are also correspondences between the task portions and task routines. More specifically, the user interface task portion 901 corresponds to a user interface routine 921, the communications task portion 902 corresponds to a communications routine 922, the decompression task portion 904 corresponds to either of decompression routines 924*a* and 924*b*, the adjusting task portion 905 corresponds to either of adjusting routines 925*a* and 925*b*, the communications task portion 908 corresponds to a communications routine 928, and the user interface task portion 909 correspond to a user interface routine 929. With the task routines 924*a* and 925*a* stored on the personal portable device 100, and with the task routines 924*b* and 925*b* stored on the personal portable device 200, it may be that the task portions are each potentially assignable to either of these personal portable devices. However, as depicted in FIG. 2*a*, the task portion 904 is assigned to be performed by the personal portable device 100 along with the task portions 901 and 902, and the task portion 905 is assigned to be performed by the personal portable device 200 along with the task portions 908 and 909. This corresponds to the processor 110 being assigned to execute sequences of instructions of the task routines 921, 922 and 924*a*, and the processor 210 being assigned to execute sequences of instructions of the task routines 925*b*, 928 and 929, while the task routines 924*b* and 925*a* are not executed, as depicted in FIG. 2*b*.

The distribution of task portions depicted in FIG. 2*a* and the corresponding distribution of assignments of execution of task routines depicted in FIG. 2*b*, like those discussed with regard to the more general example embodiment of FIGS. 1*a* and 1*b*, are derived based on the relative capabilities of the personal portable devices 100 and 200 to perform the various task portions assigned to them. Again, in determining such relative capabilities, various factors are evaluated, including and not limited to, the storage capacities and processing throughputs required to execute each task routine, the storage capacities of the storages 120 and 220, the processing throughputs of the processors 110 and 210, the network data transfer rates required to execute each task routine, the data transfer capacities of the transceivers 130 and 230, the user interactions required to execute each task routine, the user interaction capabilities of the interactive components 140 and 240, which of the storages 120 and 220 contains required routines and/or data, whether or not required routines and/or data are able to be moved to between the storages 120 and 220, and relative capabilities and/or version levels of different routines where there is more than one routine available to perform a particular task portion. Again, this derivation of a distribution of the task portions of the task 900 among the personal portable devices 100 and 200 may be performed by only one or the other of the processors 110 and 210, or by both of the processors 110 and 210 acting in cooperation as a result of executing instructions of one or the other or both of the assignment routines 125 and 225, respectively. As will now be explained, one or both of the processors 110 and 210 are caused by one or both of the assignment routines 125 and 225 to retrieve various pieces of information related to performing the task 900, are caused to perform comparisons between requirements data indicating required capabilities and capabilities data indicating either all possibly available capabilities or capabilities available at a given time to derive possible distributions, and may be caused to derive a preferred distribution where there is more than one possible distribution.

As part of deriving the distribution of the task portions of the task 900 depicted in FIG. 2*a*, information concerning what task portions make up the task 900 must be retrieved by one or both of the processors 110 and 210, along with what corresponding task routines are stored within each of the storages 110 and 210 of the personal portable devices 100 and 200, respectively. In the case of what is depicted in FIG. 2*b*, such retrieved information indicates that the personal portable device 100 has stored within the storage 120 the user interface routine 921 enabling user interaction with the personal portable device 100 to select the audio data 950 to be audibly output, the communications routine 922 enabling communications by the personal portable device 100 through the network 2000, the decompression routine 924*a* to decompress the audio data 950, and the adjusting routine 925*a* to adjust one or more characteristics of the audio data 950. Such retrieved information also indicates that the personal portable device 200 has stored within the storage 220 the user interface routine 929 enabling user interaction with the personal portable device 200 to employ at least one acoustic driver of the interactive component 240 to audibly output the audio data 950, the communications routine 928 enabling communications by the personal portable device 200 through the network 2000, the decompression routine 924*b*, and the adjusting routine 925*b*.

As those skilled in the art will readily recognize, the user interface routines 921 and 929 are likely to be tailored to particular unique capabilities of the interactive components 140 and 240, respectively, and there are unlikely to be analogous routines stored within either of the other of these personal portable devices. Therefore, it is likely that the task routines 921 and 929 are meant to be executed only by the processors 110 and 210. Given the somewhat specialized forms of user interaction entailed in performing each of the task portions 901 and 909, especially given that the task portion 909 entails the actual performance of audible output, the unique capabilities of the interactive components 140 and 240 make it likely that the task portions 901 and 909 can be assigned only to the personal portable devices 100 and 200, respectively. Similarly, as those skilled in the art will readily recognize, the communications routines 922 and 928 are likely tailored to particular unique capabilities of the transceivers 130 and 230 of the personal portable devices 100 and 200, respectively, and therefore, are likely meant to be executed only by the processors 110 and 210. It is further likely that performance of the corresponding communications task portions 902 and 908 can be assigned only to the personal portable devices 100 and 200, respectively. In other words, as those skilled in the art will recognize, it is likely that some specialization among various personal portable devices will effectively require that at least some of the task portions of a task, such as the task portions 901, 902, 908 and 909 of the task 900, be assigned to be performed by only certain ones of the personal portable devices.

In contrast, other task portions, such as the task portions 904 and 905, may not be so closely tailored to the more specialized capabilities of any particular personal portable device. With the task routines 924*a* and 925*a* stored within the personal portable device 100 being largely analogous to the task routines 924*b* and 925*b*, respectively, stored within the personal portable device 200, the task portions 904 and 905 are each more easily assignable to either of these personal portable devices. In other words, it is not necessarily unlikely that both a personal portable device meant to store audio data and a personal portable device meant to audibly output wirelessly-received audio may each possess task routines enabling each personal portable device to perform overlapping task portions, such as the decompression task portion 904 or the adjusting task portion 905. Therefore, and more specifically, it is not necessarily unlikely that both the personal portable devices 100 and 200 may possess task routines for decompressing and adjusting characteristics of the audio data 950.

Upon retrieving information indicating what task portions make up the task 900, one or both of the processors 110 and 210 must retrieve information concerning the various requirements for the performance of each of the task portions 901, 902, 904, 905, 908 and 909. More precisely, requirements data providing information concerning the requirements of the task routines 921, 922, 924*a*, 924*b*, 925*a*, 925*b*, 928 and 929 must be retrieved, including and not limited to the processing throughput and storage requirements of each of these task routines. Also, capabilities data must be retrieved providing information concerning the various capabilities of each of the personal portable devices 100 and 200 and/or information concerning what capabilities of each of the personal portable devices are not already committed to other routines unrelated to the task 900 such that those capabilities are partially or entirely unavailable. By way of example, such retrieved information indicates what capabilities are incorporated into the interactive component 140 to enable user selection of the audio data 950 for being audibly output (e.g., presence/absence of manually-operable controls, pixel resolution of a visual display to visually depict a name or title associated with the audio data 950, etc.), what capabilities are incorporated into the interactive component 240 to enable audible output (e.g., quantity of acoustic drivers, output frequency limitations, etc.). Also by way of example, such information may indicate maximum and/or available processing throughput of the processors 110 and 210, maximum and/or available data throughput of the transceivers 130 and 230, or maximum and/or available storage capacities of the storages 120 and 220.

The retrieval of at least some of the aforementioned information concerning requirements of each of these task routines and the available capabilities of each of the personal portable devices 100 and 200 enables a comparison by one or both of the processors 110 and 210 between those requirements and those available capabilities to determine what distributions of the task portions of the task 900 among the personal portable devices 100 and 200 are possible. By way of example (and as already discussed to some degree) such retrieved information may indicate that the interactive component 140 has the capabilities required to enable performance of the task portion 901, while the interactive component 240 does not, and therefore, the personal portable device 100 is assigned to perform the task portion 901 by way of the processor 110 being assigned to execute the task routine 921 to thereby cause the processor 110 to operate the interactive component 140 to perform the task portion 901, as depicted. Also by way of example, despite the storage within each of the personal portable devices 100 and 200 of analogous task routines 924*a* and 924*b*, respectively, it may be that the processing throughput that would be required of the processor 210 to execute the task routine 924*b* to perform the task portion 904 simply isn't available, while the processing throughput that would be required of the processor 110 to execute the task routine 924*a* to perform the task portion 904 is available, and as a result, the personal portable device 100 is assigned to perform the task portion 904, as depicted.

Where a comparison between the requirements of the task routines corresponding to the task portions of the task 900 and the capabilities of the personal portable devices 100 and 200 yields more than one possible distribution of assignments of execution of task routines, the derivation of the depicted distribution may then additionally entail selecting a preferred distribution from among those possible distributions in accordance with one or more goals. A goal influencing which distribution is preferred may be that of seeking to use the most recent versions of each task routine to perform each task portion, where possible. By way of example, where one possible distribution of task portions entails having the task portion 905 performed by the processor 110 executing the task routine 925*a*, and another possible distribution entails having the task portion 905 performed by the processor 210 executing the task routine 925*b*, the derivation of a distribution of task portions may be determined by which of the task routines 925*a* and 925*b* is a more recent version. Alternatively and/or additionally, a goal influencing which distribution is preferred may be that of seeking to use whichever task routine out of multiple task routines corresponding to a single task portion provides the most features. By way of example, where one possible distribution entails having the processor 110 execute the decompression routine 924*a* to perform the decompression task portion 904, and the another possible distribution entails having the processor 210 execute the decompression routine 924*b* to do so, the derivation of a distribution of task portions may be determined by which of the task routines 924*a* and 924*b* provides additional features not provided by the other (e.g., audio noise reduction, frequency re-equalization, etc.). Further, one goal may be prioritized over another goal such that, for example, one task routine is selected over another due to providing a feature that the other does not, despite the other being a more recent version.

Alternatively and/or additionally, the derivation of a distribution may be further influenced by additional limitations beyond task routines and available capabilities, including and not limited to, locality of data required to perform a task, such as the audio data 950. More precisely, a limit on possible distributions of assignments of execution of task routines may be imposed by the audio data 950 being stored in the storage 120. In some embodiments, it may be that licensing limitations regarding the audio data 950 restrict the manner in which the audio data 950 may be communicated between the personal portable devices 100 and 200. By way of example, it may be that the audio data 950 may be copied only in its compressed form (especially if the compressed form incorporates encryption, digital watermarking, and/or other forms of copy protection) from the storage 120 to the storage 220, and can only be decompressed within the personal portable device 200 as it is audibly output. This may well dictate that only the task routines 924*b* and 925*b* may be used in performing the task portions 904 and 905 (i.e., decompressing and adjusting the audio data 950), thereby effectively necessitating the assignment of the task portions 904 and 905 to the personal portable device 200 regardless of any advantage that might be afforded through the use of either of the task routines 924*a* and 925*a*. Alternatively and also by way of example, it may be that no lasting or complete copy of the audio data 950 is permitted to reside within the personal portable device 200, thereby possibly precluding the decompression of the audio data 950 by the personal portable device 200, and thereby resulting in the task portion 904 necessarily being assigned to be performed by the personal portable device 100 such that at least the task routine 924*a* is required to be used regardless of any advantage that might be afforded by using the task routine 924*b*.

Figure 3A:
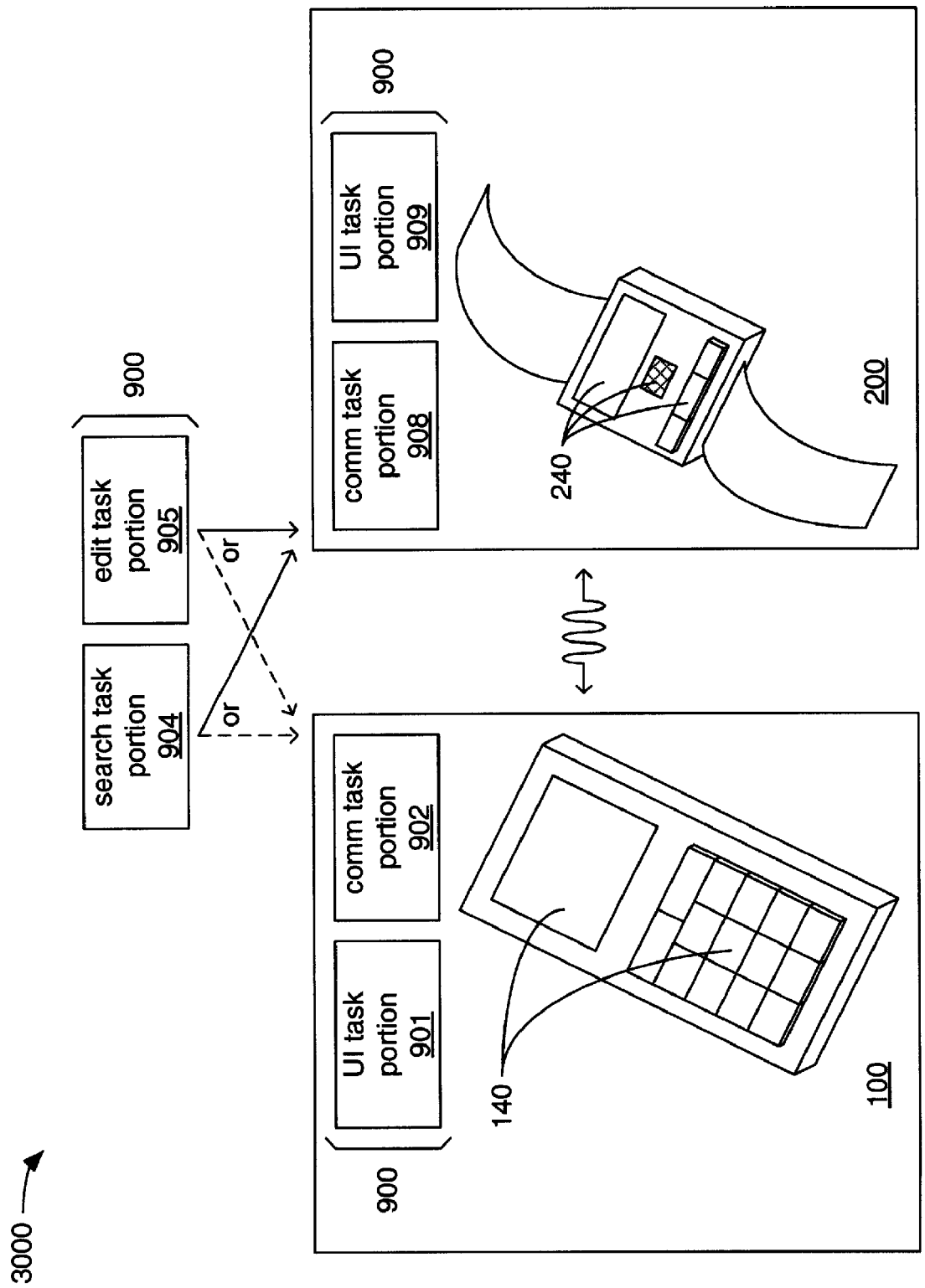
FIG. 3a is a block diagram depicting a distribution of task portions among two personal portable devices in still another network.
Figure 3B:
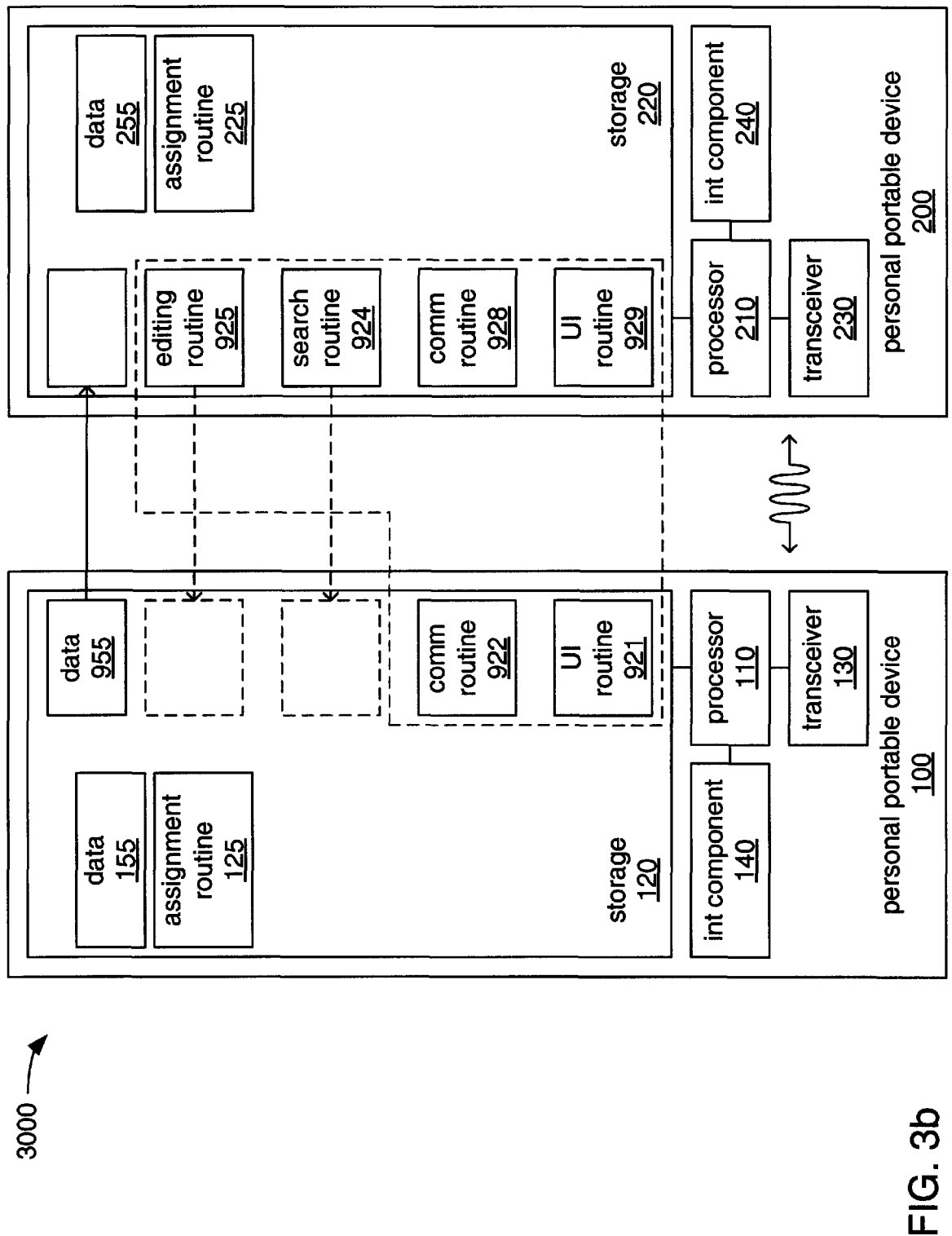
FIG. 3b is a block diagram of internal architectures of the two personal portable devices of the network of FIG. 3a depicting a corresponding distribution of assignments of execution of task routines among the two personal portable devices.

FIGS. 3*a* and 3*b* are block diagrams that, taken together, depict the manner in which a personal portable device 100 and a personal portable device 200 wirelessly linked in a network 3000 cooperate to perform a task 900 of editing a data 950 stored within the personal portable device 100 through the personal portable device 200. FIG. 3*a* depicts the division of the task 900 into various task portions, and how these task portions are distributed among the personal portable devices 100 and 200. FIG. 3b depicts aspects of possible internal architectures of the personal portable devices 100 and 200, and how the distribution of assignments of task portions corresponds to a possible distribution of assignments of execution of routines among the personal portable devices 100 and 200.

Each of the personal portable devices 100 and 200 may be any of a variety of types personal portable device. However, like FIGS. 2a and 2b, FIGS. 3a and 3b and the discussion that follows, are meant to provide a more specific example of distributing portions of a more specific task between more specific forms of the personal portable devices 100 and 200 than was discussed in more general terms with regard to the personal portable devices 100 and 200 of FIGS. 1a and 1b. Therefore, as depicted, the personal portable device 100 is a hand-holdable device appropriate for storing data (e.g., a PDA, a PIM, a PND, or a cellular telephone), and the personal portable device 200 is a wrist-worn device appropriate for editing data stored in the personal portable device 100. Due to numerous correspondences of features between FIGS. 1a and 1b, and FIGS. 3a and 3b, numerous identical numeric labels have been used.

Not unlike the personal portable device 100 of FIGS. 1a and 1b, the personal portable device 100 of FIGS. 3a and 3b incorporates a storage 120, a transceiver 130 and an interactive component 140, one or more of which are accessible by a processor 110 also incorporated into the personal portable device 100. Similarly, not unlike the personal portable device 200 of FIGS. 1a and 1b, the personal portable device 200 of FIGS. 3a and 3b incorporates a storage 220, a transceiver 230 and an interactive component 240, one or more of which are accessible by a processor 210 also incorporated into the personal portable device 200. Again, each of the processors 110 and 210, the storages 120 and 220, the transceivers 130 and 230, and the interactive components 140 and 240 may be based on any of a variety of technologies. However, in embodiments in which the personal portable device 100 is of a form appropriate for storing data, and in which the personal portable device 200 is of a form appropriate for enabling a user to edit data, the interactive component 240 is likely to incorporate a visual displays capable of displaying text and a manually-operable keyboard capable of being used to input text, as depicted in FIG. 3a, while the interactive component 140 is likely to do so.

In a manner not unlike the task 900 of FIGS. 1a and 1b, in FIGS. 3a and 3b, the task 900 of editing data stored on the personal portable device 100 through the personal portable device 200 is divided up into a user interface task portion 901, a communications task portion 902, a search task portion 904 enabling the content of the data 950 to be searched, an edit task portion 905 enabling the content of the data 950 to be edited, a communications task portion 908 and a user interface task portion 909. Not unlike the task portions and routines assigned to the personal portable devices 100 and 200 in FIGS. 1a and 1b, among the personal portable devices 100 and 200 of FIGS. 3a and 3b, the user interface task portion 901, the communications task portion 902, the search task portion 904, the editing task portion 905, the communications task portion 908 and the user interface task portion 909 correspond to various task routines, specifically, a user interface routine 921, a communications routine 922, search routines 924a and 924b, editing routines 925a and 925b, a communications routine 928 and a user interface routine 929, respectively.

As depicted in FIG. 3a, the distribution of task portions of the task 900 is such that the task portions 901 and 902 are assigned to performed by the personal portable device 100, while the task portions 904, 905, 908 and 909 are assigned to be performed by the personal portable device 200. This corresponds to a distribution of assignments of execution of task routines depicted in FIG. 3b in which the task routines 921 and 922 are assigned to be executed by the processor 110 of the personal portable device 100, while the task routines 924, 925, 928 and 929 are assigned to be executed by the processor 210 of the personal portable device 200.

This distribution of task portions and corresponding distribution of assignments of execution of task routines, like those discussed with regard to the more general example embodiments of FIGS. 1a and 1b, are derived based on the relative capabilities of the personal portable devices 100 and 200 to perform the various task portions assigned to them based on a variety of factors, as previously detailed. Again, the derivation of a distribution of the task portions and corresponding distribution of assignments of execution of task routines may be performed by only one or the other of the processors 110 and 210, or cooperatively by both of the processors 110 and 210 as a result of executing instructions of one or the other or both of the assignment routines 125 and 225, respectively.

As previously discussed with regard to the task routines 901, 902, 908 and 909 of the task 900 of FIGS. 2a and 2b, particular ones of the task routines 901, 902, 908 and 909 of the task 900 of FIGS. 3a and 3b may be greatly tailored to unique capabilities of one or the other of the personal portable devices 100 and 200 of FIGS. 3a and 3b. As a result, the task portions 901 and 902 are at least more likely to be assigned to be performed by the personal portable device 100 and the task portions 908 and 909 are at least more likely to be assigned to be performed by the personal portable device 200, as depicted in FIG. 3a. Correspondingly, the task routines 921 and 922 are more likely to be assigned to be executed by the processor 110, and the task routines 928 and 929 are more likely to be assigned to be executed by the processor 110, as depicted in FIG. 3b.

The task portions 904 and 905 of FIGS. 3a and 3b may be more easily assignable to either of the personal portable devices 100 and 200 in a manner similar to task portions 904 and 905 of FIGS. 2a and 2b. However, unlike the task portions 904 and 905 of FIGS. 2a and 2b, the task portions 904 and 905 of FIGS. 3a and 3b do not have corresponding analogous task routines stored within both of the personal portable devices 100 and 200. Instead, and as depicted in FIG. 3b, the task routines 924 and 925 that correspond to the task portions 904 and 905, respectively, are stored solely within the storage 220 of the personal portable device 200 where they may be accessed for execution by the processor 210. Due to the lack of analogous task routines stored within the personal portable device 100, any assignment of either of the task portions 904 and 905 to the personal portable device 100 the might occur may entail the copying of one or both of the task routines 924 and 925 to the storage 120 of the personal portable device 100 to enable access and execution by the processor 110.

While such copying of the task routines 924 and 925 between the personal portable devices 100 and 200 may be possible, thereby possibly enabling the assignment of one or both of the task portions 904 and 905 to the personal portable device 100, it may be that the processor 110 is not capable of executing either of the task routines 924 and 925 as a result of incompatibility between the processor 110 and the task routines 924 and 925. In such a situation, the depicted distribution of the task portions 904 and 905 to the personal portable device 200 may be the only distribution possible. Alternatively and/or additionally, it may be that a licensing agreement or other similar restriction dictates that such copying of one or the other of the task routines 924 and 925 between the personal portable devices 100 and 200 is not permitted. As a result, it may be that the task portions 904 and/or 905 are not assignable to the personal portable device 100, and must necessarily be assigned to be performed by the personal portable device 200, instead.

Where such copying of the task routines 924 and 925 between the personal portable devices 100 and 200 to enable the assignment of one or both of the task portions 904 and 905 to the personal portable device 100 is not prevented by licensing restrictions or technological limitations (e.g., incompatibility), such copying of task routines may, in some embodiments, be necessary where it is somehow impermissible to copy the data 950 between the personal portable devices 100 and 200. In other words, a licensing restriction regarding the data 950 may limit or entirely forbid copying of the data 950 to the personal portable device 200 where the task routines 924 and 925 may be employed to edit and/or perform searches of the data 950 within the personal portable device 200. Where it is possible for one or both of the routines 924 and 925 to be executed by the processor 210 in a manner in which the data 950 is accessed through the network 3000, then one or both of the task portions 904 and 905 may be assigned to the personal portable device 200. Where it is possible for one or both of the routines 924 and 925 to be copied to the personal portable device 100, then one or both of the task portions 904 and 905 may be assigned to the personal portable device 100 where the data 950 may be accessed more directly.

Figure 4A:
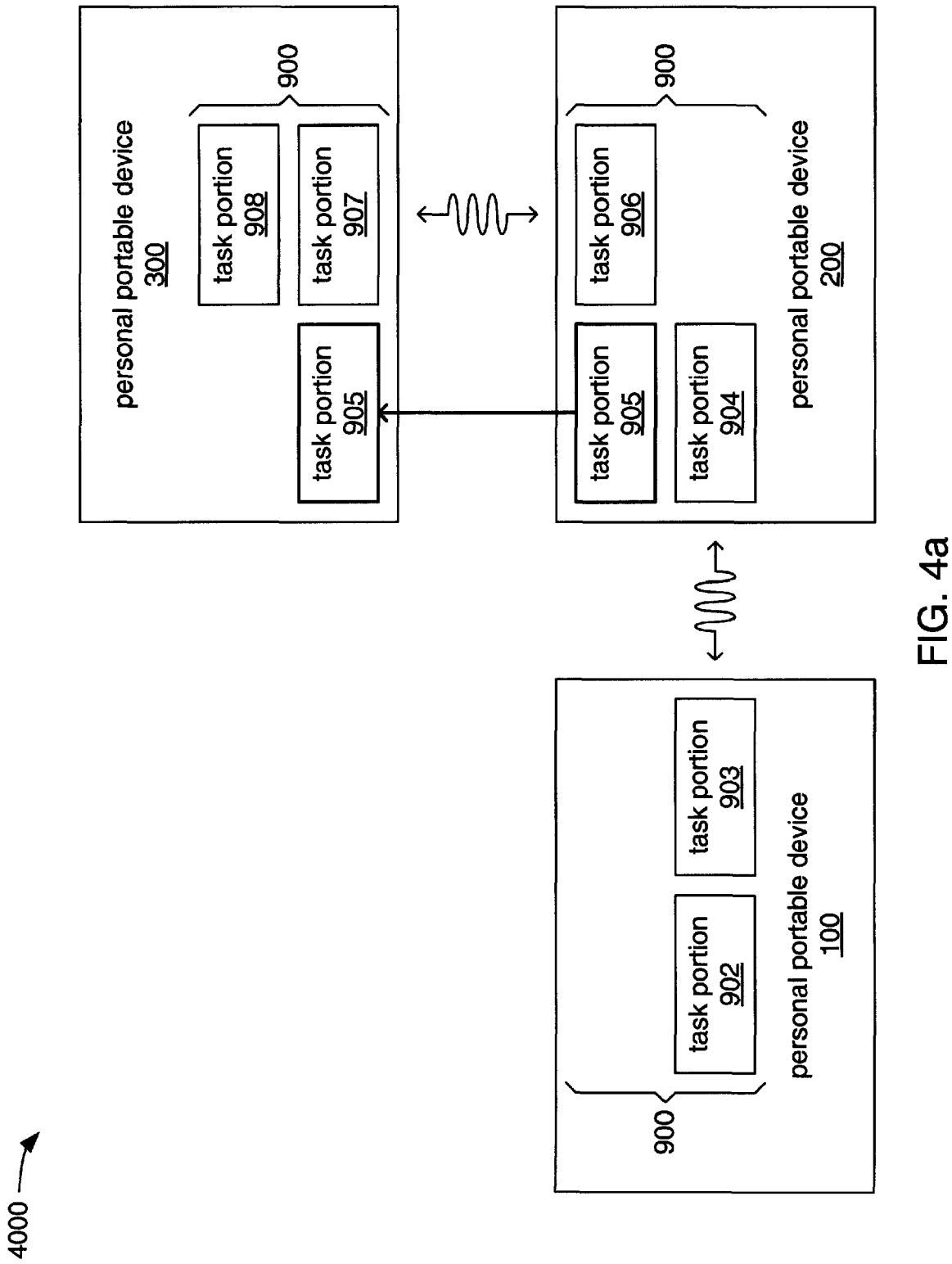
FIG. 4a is a block diagram depicting a change in distribution of task portions among personal portable devices in a network having a chain topology.
Figure 4B:
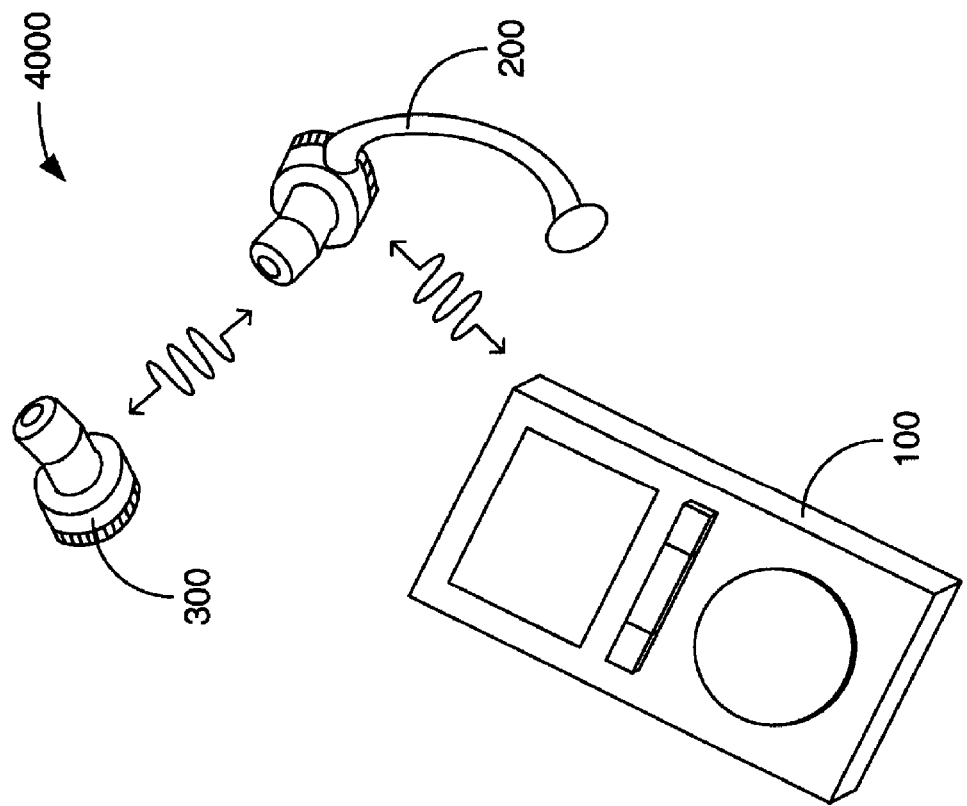
Figure 4C:
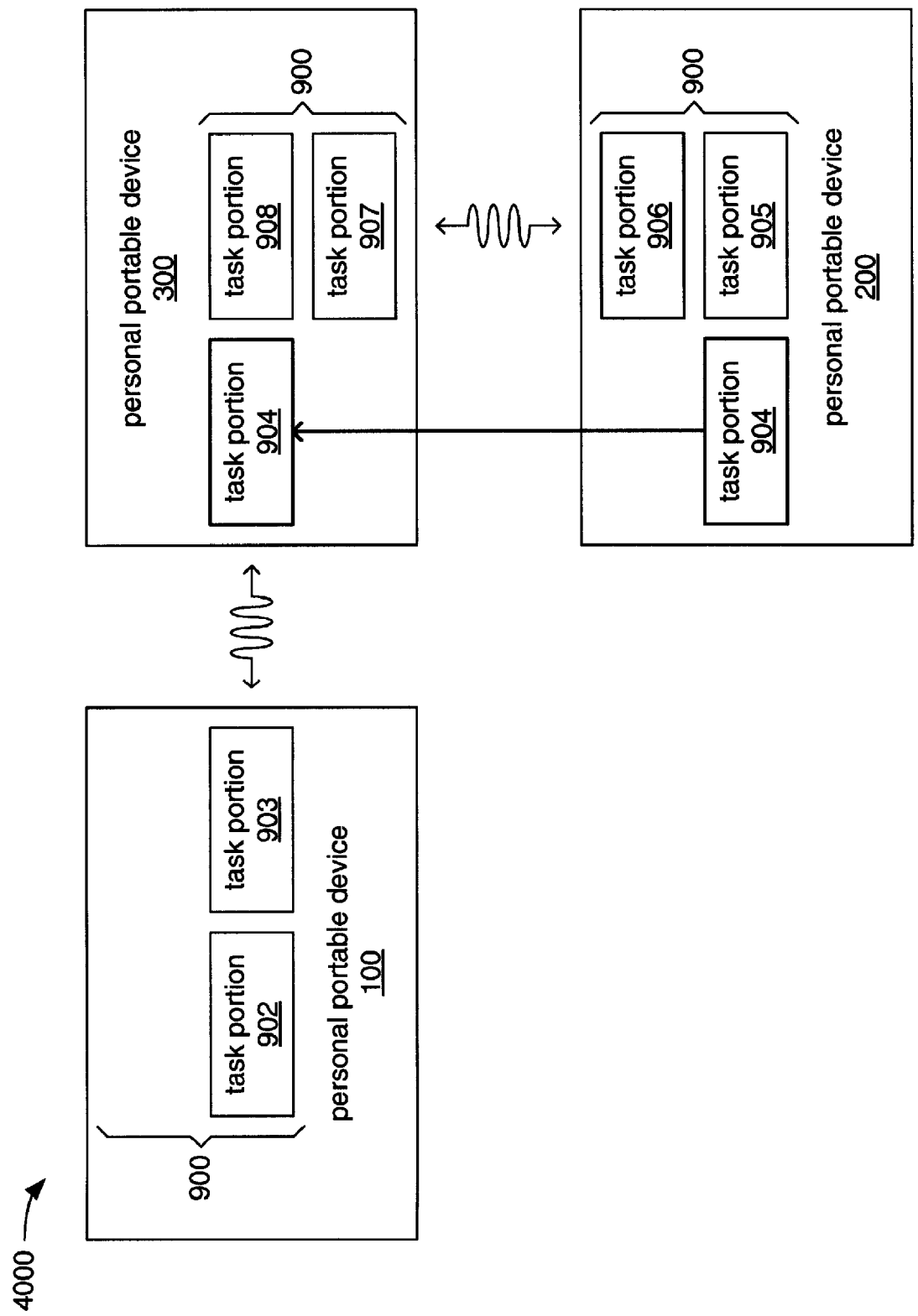
Figure 4D:
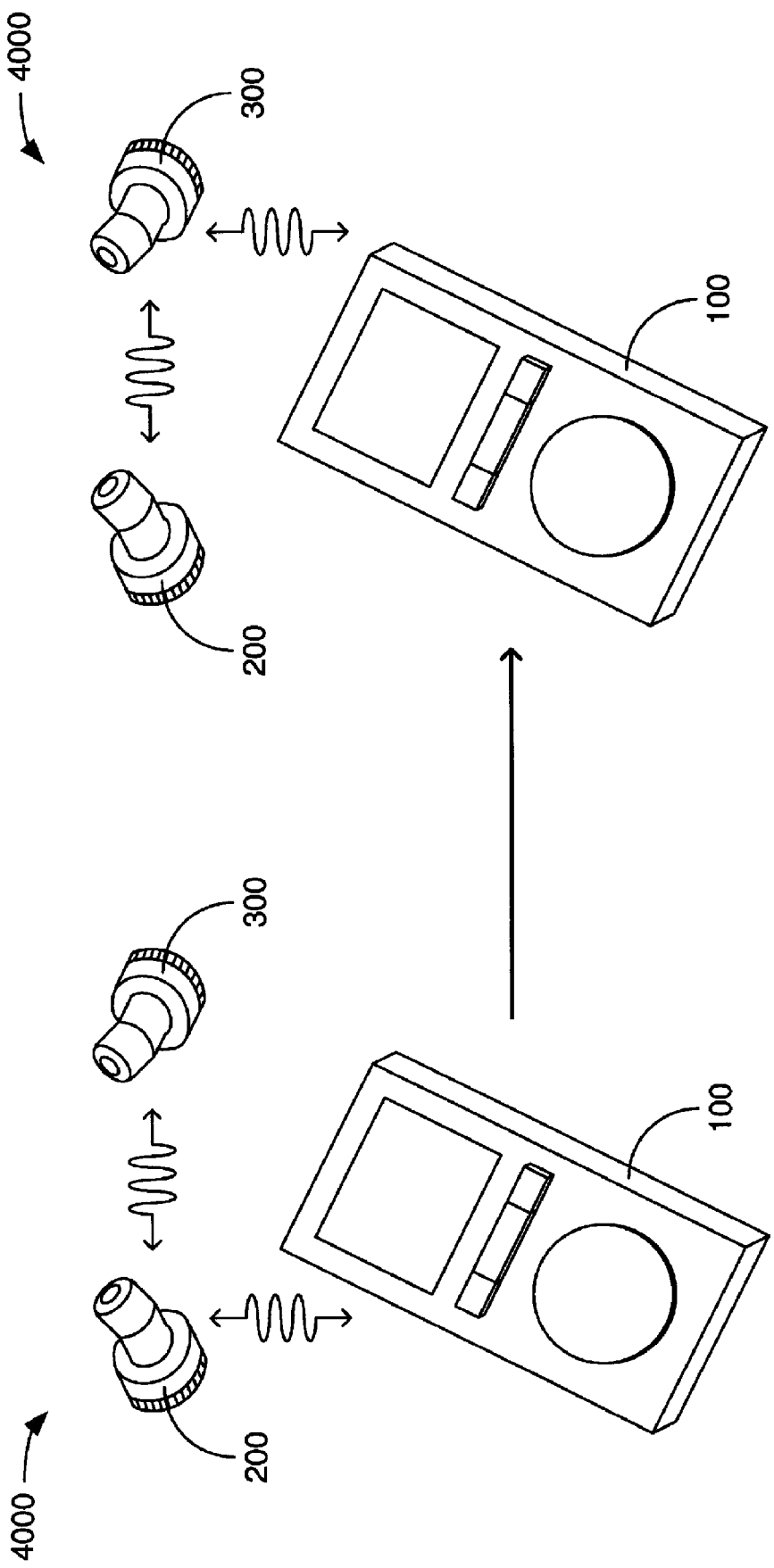
FIG. 4d is a perspective diagram depicting a more specific example of the change in distribution of task portions of FIG. 4c.

FIGS. 4a, 4b, 4c and 4d are block diagrams that each depict three personal portable devices 100, 200 and 300 in a chain topology network 4000 cooperating to perform various incarnations of a task 900, but depicting different forms of reassignment of a portion of the task 900 among these three personal portable devices in response to changing availability of the relative capabilities of the personal portable devices 100, 200 and 300. FIG. 4a depicts a reassignment of a task portion unrelated to network communications from the personal portable device 200 to the personal portable device 300. FIG. 4b depicts a more specific example of the form of reassignment of a task portion depicted in FIG. 4a. FIG. 4c depicts a reassignment of a task portion related to network communications from the personal portable device 200 to the personal portable device 300 that results in a change in relative positions of these three personal portable devices in the chain topology of the network 4000. FIG. 4d depicts a more specific example of the form of reassignment of a task portion depicted in FIG. 4c.

Not unlike the personal portable devices 100 and 200 of the network 1000 in FIGS. 1a and 1b, the personal portable devices 100, 200 and 300 of the network 4000 may each be any of a variety of types personal portable device. In a manner not unlike the task 900 depicted in FIGS. 1a and 1b, the task 900 depicted in FIGS. 4a and 4b is divided up into seven task portions 902 through 908, and those task portions are distributed among these three personal portable devices. The task portions 902 and 903 are initially assigned to be performed by the personal portable device 100; the task portions 904, 905 and 906 are initially assigned to be performed by the personal portable device 200; and the task portions 907 and 908 are initially assigned to be performed by the personal portable device 300. Not unlike what has been discussed with regard to previously detailed examples, this initial distribution of task portions assigned to the personal portable devices 100, 200 and 300 is derived based on the various capabilities of each of these personal portable devices to perform the various task versus the various capabilities required by each task portion.

Beyond depicting an initial distribution of task portions among the personal portable devices 100, 200 and 300, FIGS. 4a and 4b also depict a dynamic reassignment of at least one of those task portions arising from a change in availability of one or more capabilities of one or more of the personal portable devices 100, 200 and 300. Such a change in capability may be an instance of a capability of one of these personal portable devices becoming available after being unavailable or becoming available to a greater degree after being available only to a more limited degree at an earlier time when an earlier distribution was derived. Alternatively, such a change in capability may be an instance of a capability of one of these personal portable devices becoming unavailable after being available or becoming less available after being available to a greater degree. In other words, FIGS. 4a and 4b illustrate that a distribution of task portions need not remain static upon being derived, but can be dynamic such that earlier distributions may be changed through subsequent derivations of new distributions in response to changes in capabilities provided by each of the personal portable devices 100, 200 and 300.

More specifically, FIG. 4a depicts the reassignment of the task portion 905 from being assigned to be performed by the personal portable device 200 to being assigned to be performed by the personal portable device 300. As those skilled in the art will readily recognize, changes in capabilities provided by one or more of the personal portable devices 100, 200 and 300 prompting the derivation of a new distribution that results in this reassignment may arise from a variety of possible circumstances. By way of example, it may be that a processor of the personal portable device 200 is subsequently required to execute instructions of a routine associated with a task unrelated to the task 900 such that the amount of processing throughput required to enable the personal portable device 200 to perform the task portion 905 ceases to be available. By way of another example, interference with the exchange of wireless signals through the wireless network 4000 may diminish the data throughput available between two or more of the personal portable devices 100, 200 and 300 such that data throughput required to enable the personal portable device 200 to perform the task portion 905 ceases to be available. In other words, this reassignment may be prompted by a need to reassign the performance of the task portion 905 in order to ensure that the task portion 905 continues to be performed. By way of still another example, it may be that a processor of the personal portable device 300 is subsequently able to provide a greater degree of processing throughput than before, and this enables that processor to perform the task portion 905 by executing a corresponding task routine stored within the personal portable device 300 that enables the personal portable device 300 to perform the task portion 905 in some way that is preferred in comparison to the personal portable device 200 continuing to perform the task portion 905. In other words, an opportunity to improve the manner in which the task portion 905 is performed may come about, and this reassignment is made to take advantage of that opportunity.

Turning to FIG. 4b, the form of reassignment depicted in FIG. 4a is applied to the more specific situation depicted in FIG. 4b such that FIG. 4a represents a possible architecture employed by the personal portable devices 100, 200 and 300 of FIG. 4b. In FIG. 4b, the personal portable devices 100, 200 and 300 cooperate to perform an incarnation of the task 900 introduced in FIG. 4a, and in FIG. 4b, the task 900 is that of supporting two-way audio communications in which monaural audio transmitted across the network 4000 by the personal portable device 100 is audibly output to a user through at least one acoustic driver of each of the personal portable devices 200 and 300, and where monaural audio spoken by the user is detected through a microphone of the personal portable device 200 and transmitted back to the personal portable device 100. As depicted, the personal portable device 300 is in the form of a wireless earpiece meant to be at least partially inserted into one ear of the user, the personal portable device 200 is in the form of a wireless headset meant to be at least partially inserted into the user's other ear, and the personal portable device 100 is in the form of an RF device such as a cellular telephone or walkie-talkie.

As those skilled in the art will already recognize, it has become increasingly commonplace for personal portable devices used in audio communications to employ wireless technology conforming to the Bluetooth specification. However, the Bluetooth specification currently has no provision for distributing the transmission of outgoing audio that is part of two-way audio communication such that outgoing audio could be transmitted by one device to multiple other devices. Further, the Bluetooth specification also has no provision for also receiving incoming audio from one of multiple devices to which outgoing audio is being transmitted as part of two-way audio communication. Instead, Bluetooth is currently limited to supporting a bi-directional exchange of audio in two-way audio communications between only two devices. Therefore, there is currently no provision in Bluetooth for enabling the personal portable device 100 to simultaneously transmit outgoing audio to both of the personal portable devices 200 and 300 for audible output to both ears of the user while simultaneously receiving incoming audio spoken by the user from the personal portable device 200. To overcome this, the personal portable device 200 falsely presents itself to the personal portable device 100 as being a simple single device having both a microphone and an acoustic driver to support two-way audio communications, without revealing its role in retransmitting audio to another device. This has the effect of inducing the personal portable device 100 to transmit outgoing audio to the personal portable device 200 and receive incoming audio from the personal portable device 200. The personal portable device 200, in turn, retransmits at least the outgoing audio received from the personal portable device 100 to the personal portable device 300 to be audibly output to the user.

Momentarily referring back to FIG. 4a, among the task portions 902 through 908 of the task 900 are both task portions related to communications within the network 4000 and task portions that are not related to such communications. The task portions 903 and 904 are related to network communications between the personal portable devices 100 and 200, and the task portions 906 and 907 are related to network communications between the personal portable devices 200 and 300 to implement the chained retransmission of audio data that is hidden from the personal portable device 100. In contrast, the task portions 902, 905 and 908 are task portions unrelated to network communications. The non-network task portion 905 may be an audio processing task portion, including and not limited to, controlling an audio characteristic (e.g., volume, left-to-right audio channel balance, bass, treble, etc.), noise cancellation and/or audio processing to avoid occurrences of audible feedback developing between an acoustic driver of the personal portable device 300 and the microphone of the personal portable device 200. As those skilled in the art will readily recognize, it is not unlikely that more than one personal portable device having capabilities making it amenable to being employed with other personal portable devices to perform an audio-related task, such as the task 900, may well have overlapping audio processing task portions, such as the task portion 905. Therefore, where a change in capabilities available from one or the other of the personal portable devices 200 and 300 occurs, it may be that this changes prompts a derivation of a new distribution in which the task portion 905 is reassigned to be performed by the personal portable device 300, and such a change may be a diminution of the capabilities available from the personal portable device 200, or an increase in the capabilities available from the personal portable device 300.

As an alternative to the reassignment of a task portion not related to network communications, such as the task portion 905 of FIGS. 4a and 4b, in FIG. 4c, the network-related task portion 904 of another incarnation of the task 900 introduced in FIG. 4a is reassigned from being performed by the personal portable device 200 to being performed by the personal portable device 300. This reassignment is in response to a change in availability of one or more capabilities of one or more of the personal portable devices 100, 200 and 300. In this reassignment, one of the task portions involved in network communications between the personal portable devices 100 and 200 switches from being performed by the personal portable device 200 to being performed by the personal portable device 300, thereby altering the topology of the network 4000. Prior to this reassignment, the chain topology of the network 4000 with the personal portable device 200 interposed between the other two personal portable devices 100 and 300 resulted in the personal portable device 200 serving to retransmit communications between the personal portable devices 100 and 300. Following this reassignment, the network 4000 continues to have a chain topology, but the relative positions of these three personal portable devices are altered such that the personal portable device 300 is now interposed between the other two personal portable devices 100 and 200, and the personal portable device 300 now serves to retransmit communications between the personal portable devices 100 and 200.

Turning to FIG. 4d, the form of reassignment occurring in FIG. 4c is applied to the more specific situation depicted in FIG. 4d such that FIG. 4c represents a possible architecture employed by the personal portable devices 100, 200 and 300 of FIG. 4d. In FIG. 4d, the personal portable devices 100, 200 and 300 cooperate to perform an incarnation of the task 900 introduced in FIG. 4a. In FIG. 4b, the task 900 is that of audibly outputting audio data stored in the personal portable device 300 in a form having at least 2 audio channels with each of the personal portable devices 100 and 200 audibly outputting a different one of the at least 2 audio channels. The personal portable devices 200 and 300 each incorporate at least one acoustic driver to each audibly output at least one audio channel of the audio data as the audio data is transmitted across the network 4000 by the personal portable device 100. As depicted, each of the personal portable devices 200 and 300 is in the form of a wireless earpiece meant to be at least partially inserted into separate ears of a user.

As was the case with the use of Bluetooth with regard to what was depicted in FIG. 4b, FIG. 4d depicts another use of retransmission of audio data in a chain network topography to overcome a limitation of Bluetooth, albeit, a different limitation of Bluetooth in this case. More specifically, the Bluetooth specification currently has no provision for the simultaneous separate transmission of differing audio channels of a single piece of audio data to separate devices. Instead, Bluetooth is limited to supporting only the transmission of all channels of a single piece of data audio in a single transmission from one device to only one other device. Therefore, there is no provision in Bluetooth for enabling the personal portable device 100 to separately transmit left and right audio channels (for example) to each of the personal portable devices 200 and 300 for being separately audibly output into each ear of the user. To overcome this, the personal portable device 200 falsely presents itself to the personal portable device 100 as being a single device capable of audibly outputting both of the left and right audio channels. This has the effect of inducing the personal portable device 100 to transmit both the left and right audio channels of the piece of audio data to the personal portable device 200. The personal portable device 200 then retransmits at least one, if not both of the left and right audio channels to the personal portable device 300, with each of the personal portable devices 200 and 300 audibly outputting a separate one of the left and right audio channels.

Again, as those skilled in the art will readily recognize, changes in capabilities provided by one or more of the personal portable devices 100, 200 and 300 that prompt the derivation of a new distribution resulting in this reassignment may arise from a variety of circumstances. By way of example, it may be that a wireless transceiver of the personal portable device 200 is subsequently required to transfer a large quantity of data for a task unrelated to the task 900 such that the amount of data throughput required to enable the personal portable device 200 to perform the task portion 904 ceases to be available. By way of another example, it may be that a processor of the personal portable device 300 is subsequently able to provide a greater degree of processing throughput than before, and this enables that processor to perform the task portion 904 by executing a corresponding task routine stored within the personal portable device 300 that enables the personal portable device 300 to perform the task portion 904 in some way that is preferred in comparison to the personal portable device 200 continuing to perform the task portion 904.

Figure 5A:
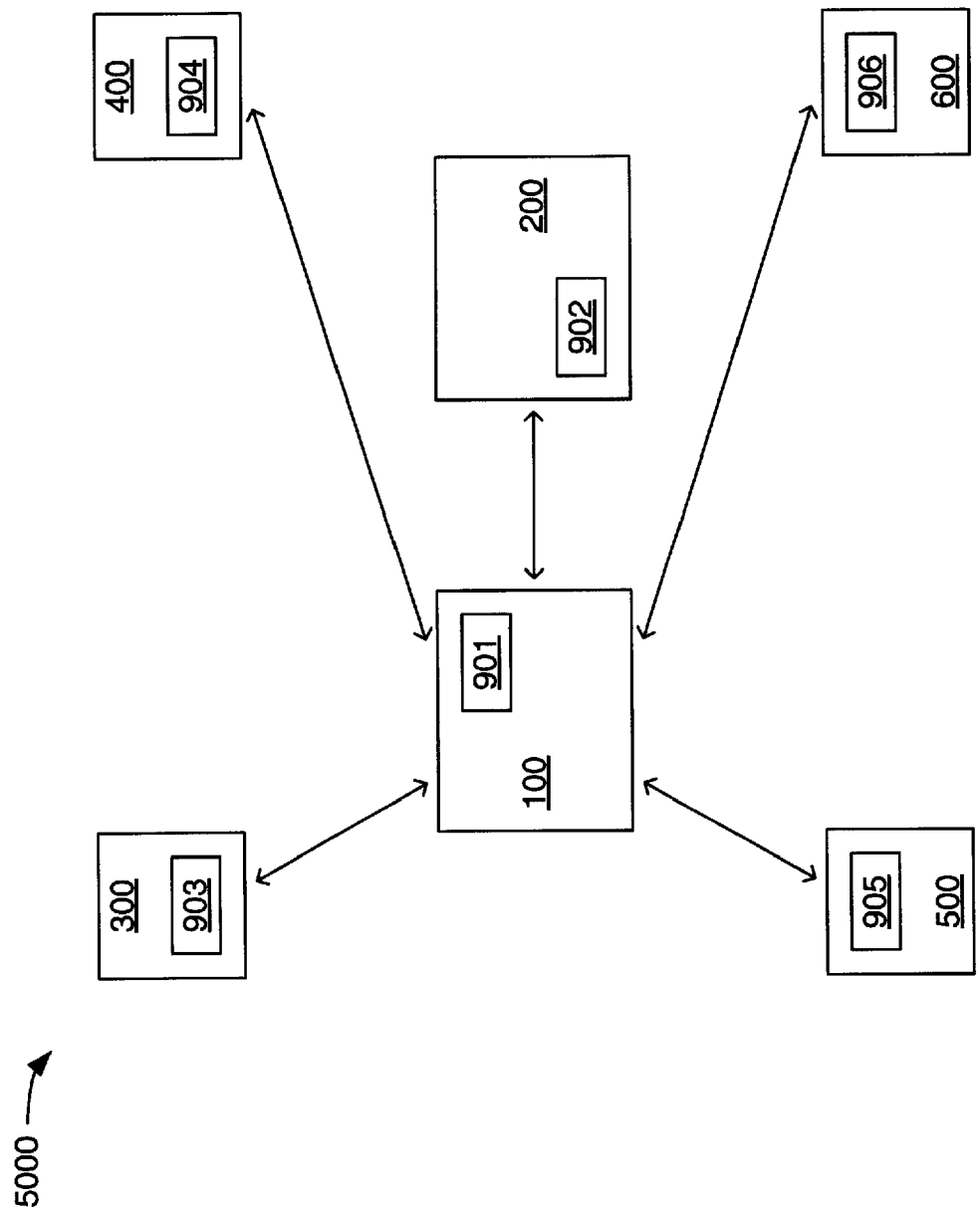
FIGS. 5a and 5b are block diagrams that together depict a change in distribution of tasks portions among two personal portable devices in a network having a star topology.
Figure 5B:
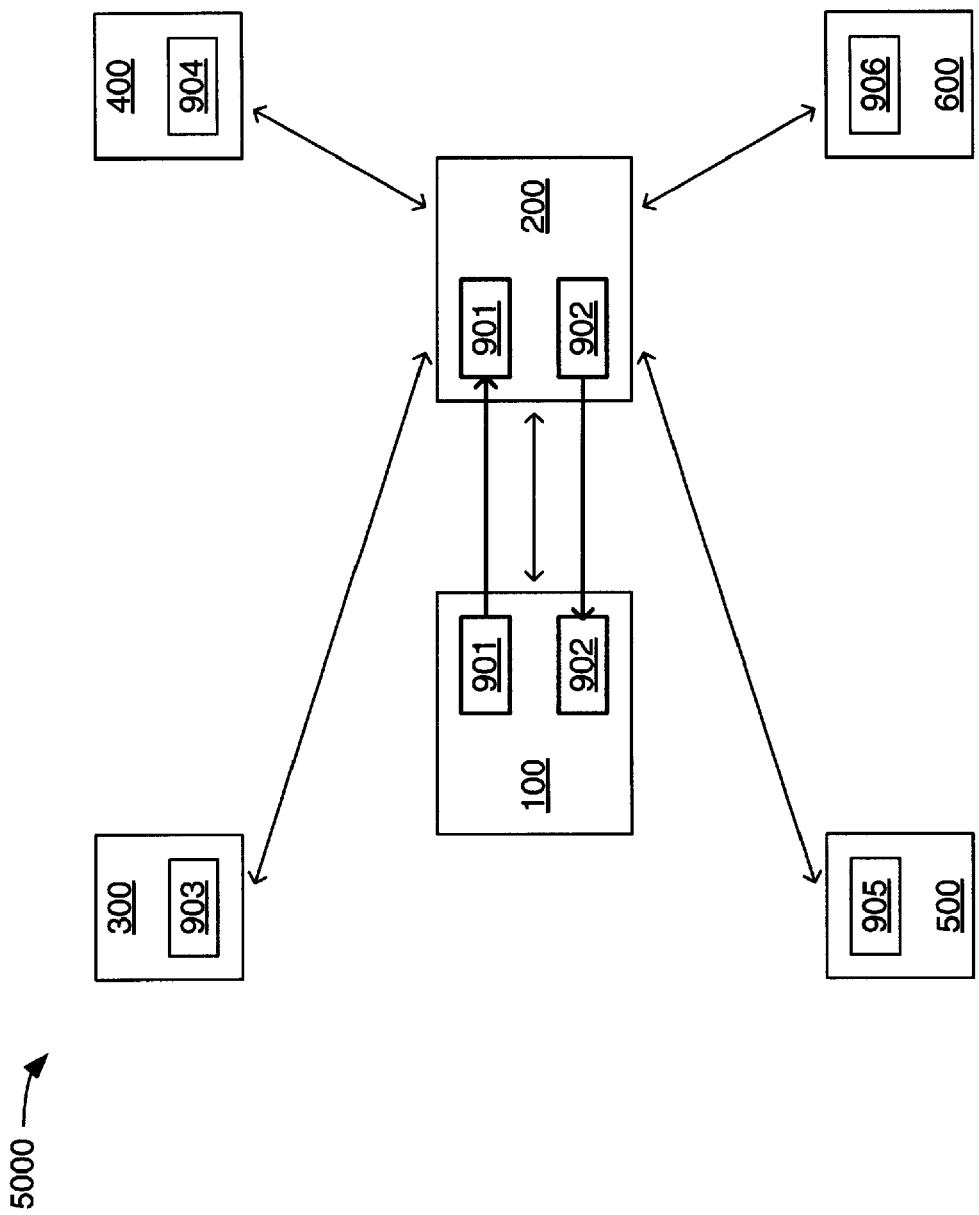

FIGS. 5a and 5b are block diagrams depicting six personal portable devices 100, 200, 300, 400, 500 and 600 in a star topology network 5000 cooperating to perform a task 900. Not unlike the personal portable devices 100 and 200 of the network 1000 in FIGS. 1a and 1b, each of the personal portable devices 100, 200, 300, 400, 500 and 600 of the network 5000 may be any of a variety of types personal portable device. In a manner not unlike the task 900 depicted in FIGS. 1a and 1b, the task 900 of FIGS. 5a and 5b is divided up into six task portions 901, 902, 903, 904, 905 and 906 that are initially assigned to be performed by the personal portable devices 100, 200, 300, 400, 500 and 600, respectively.

All of the task portions 901 through 906 are task portions related to communications within the network 5000. More specifically, the task portion 901 is related to network communication between the personal portable device 100 and the other five personal portable devices 200 through 600, which corresponds to the personal portable device 100 being at the center of the network 5000. Further, the task portion 902 is related to network communications between the personal portable devices 100 and 200, which corresponds to the personal portable device 200 being at one of the endpoints of the star topology of the network 5000. As those skilled in the art will readily recognize, the task portion 901 differs significantly from the task portions 902 through 906 insofar as the task portion 901 entails communications with five other devices while each of the task portions 902 through 906 entails communications with only one other device.

FIG. 5a depicts the initial distribution of these task portions among these six personal portable devices. FIG. 5b depicts the reassignment of two of these task portions between the personal portable devices 100 and 200 as part of a change to the initial distribution of these task portions in response to changing availability of capabilities of one or more of these personal portable devices resulting in a change in the relative positions of these six personal portable devices in the star topology of the network 5000. More specifically, the task portions 901 and 902 are both reassigned such that they are "swapped" between the personal portable devices 100 and 200. As a result of this pair of reassignments, the initial center and endpoint positions of the personal portable devices 100 and 200 are exchanged, while the star topology of the network 5000 is maintained.

Other embodiments are within the scope of the following claims.

What is claimed is:

1. A first personal portable device to cooperate with at least a second personal portable device through a wireless network to perform a task comprising a plurality of task portions, the first personal portable device comprising:
   a first wireless transceiver to enable communications across the wireless network with the second personal portable device;
   a first processor;
   a first storage in which is stored a first assignment routine comprising a sequence of instructions, that when executed by the first processor, causes the first processor to:
      retrieve a first requirements data indicating a capability required to execute a first task routine to perform a first task portion of the plurality of task portions, a second requirements data indicating a capability required to execute a second task routine to perform a second task portion of the plurality of task portions, and a first capabilities data indicating a capability of the first personal portable device to execute a routine;
      operate the first wireless transceiver to signal the second personal portable device through the wireless network to retrieve a second capabilities data indicating a capability of the second personal portable device to execute a routine;
      derive a first distribution of assignments of performances of the first and second task portions among the first and second personal portable devices in response to comparing the first requirements data to the first and second capabilities data and in response to comparing the second requirements data to the first and second capabilities data, wherein the first task portion is assigned to be performed by the first personal portable device such that the first processor is assigned to execute the first routine and the second task portion is assigned to be performed by the second personal portable device such that a second processor of the second personal portable device is assigned to execute the second routine; and
      operate the first wireless transceiver to signal the second personal portable device through the wireless network with an indication that the second personal portable device is assigned to execute the second task routine; and
   wherein the first processor being caused to derive the first distribution comprises the first processing being caused to:
      compare a version level of the first task routine to a version level of another task routine corresponding to the first task portion and stored in a second storage of the second personal portable device; and
      select the first task routine at least partially due to the version level of the first task routine being a later version than the version level of the other task routine.

2. The first personal portable device of claim 1, wherein the first capabilities data indicates a degree to which the capability of the first personal portable device remains available for executing a routine as a result of the capability of the first personal portable device being at least partly utilized in the execution of a routine of another task.

3. The first personal portable device of claim 2, wherein executing the first assignment routine further causes the first processor to:
    detect a change in the degree to which the capability of the first personal portable device remains available; and
    derive a second distribution of assignments of performance of the first and second task portions among the first and second personal portable devices in response to the change in the degree to which the capability of the first personal portable device remains available.

4. The first personal portable device of claim 1, further comprising a first interactive component having a manually-operable control to enable a user of at least the first and second personal portable devices to enable a user to signal for at least the first and second personal portable devices to cooperate to perform the task.

5. The first personal portable device of claim 1, wherein:
    the capability indicated by the first requirements data is selected from the group consisting of an indication of an amount of storage, an indication of a level of processor throughput, an indication of a level of network throughput, and an indication of a user interaction capability; and
    the capability indicated by the second requirements data is selected from the group consisting of an indication of an amount of storage, an indication of a level of processor throughput, an indication of a level of network throughput, and an indication of a user interaction capability.

6. The first personal portable device of claim 1, wherein:
    the capability available indicated by the first capabilities data is selected from the group consisting of an indication of an amount of storage within the first personal portable device, an indication of a level of processor throughput of the first processor, an indication of a level of network throughput of the first personal portable device on the wireless network, and an indication of a user interaction capability of the first personal portable device; and
    the capability available indicated by the second capabilities data is selected from the group consisting of an indication of an amount of storage within the second personal portable device, an indication of a level of processor throughput of the second processor, an indication of a level of network throughput of the second personal portable device on the wireless network, and an indication of a user interaction capability of the second personal portable device.

7. The first personal portable device of claim 1, wherein the first processor being caused to derive the first distribution comprises the first processing being caused to determine which one of the first and second personal portable devices stores a task data required to perform the task.

8. The first personal portable device of claim 1, wherein the first distribution requires that at least one of the first and second task routines be copied between the first storage of the first personal portable device and a second storage of the second personal portable device, and wherein the first processor being caused to derive the first distribution comprises the first processor being caused to determine whether at least one of the first and second task routines is compatible with at least one of the first and second processors.

9. A method of distributing a first task portion and a second task portion of a task among a first personal portable device and a second personal portable device, the method comprising:
    awaiting an indication from an operator of the first and second personal portable devices for the first and second personal portable devices to cooperate through a wireless network to perform the task;
    retrieving a first requirements data indicating a capability required to perform the first task portion, a second requirements data indicating a capability required to perform the second task portion, a first capabilities data indicating a capability of the first personal portable device, and a second capabilities data indicating a capability of the second personal portable device;
    deriving a first distribution of assignments of performances of the first and second task portions among the first and second personal portable devices in response to comparing the first requirements data to the first and second capabilities data and in response to comparing the second requirements data to the first and second capabilities data, wherein the first task portion is assigned to be performed by the first personal portable device and the second task portion is assigned to be performed by the second personal portable device;
    transmitting a signal from one of the first and second personal portable devices with an indication of the first distribution of assignments to the other of the first and second personal portable devices through the wireless network; and
    wherein:
        the first personal portable device performing the first task portion comprises a first processor of the first personal portable device retrieving a first task routine corresponding to the first task portion from a storage accessible to the first processor and executing the first task routine;
        the second personal portable device performing the second task portion comprises a second processor of the second personal portable device retrieving a second task routine corresponding to the second task portion from a storage accessible to the second processor and executing the second task routine; and
        deriving the first distribution comprises:
            comparing a version level of the first task routine to a version level of another task routine corresponding to the first task portion and stored in the second personal portable device; and
            selecting the first task routine at least partially due to the version level of the first task routine being a later version than the version level of the other task routine.

10. The method of claim 9, further comprising retrieving at least one of the first and second requirements data and at least one of the first and second capabilities data from at least one of the first and second personal portable devices through the wireless network.

11. The method of claim 9, wherein the first capabilities data indicates a degree to which the capability of the first personal portable device remains available for performing the task as a result of the capability of the first personal portable device being at least partly utilized in performing another task.

12. The method of claim 11, further comprising:
    detecting a change in the degree to which the capability of the first personal portable device remains available for performing the task; and deriving a second distribution of assignments of performance of the first and second task portions among the first and second personal portable devices in response to the change in the degree to which the capability of the first personal portable device remains available.

13. The method of claim 9, wherein awaiting an indication from an operator comprises awaiting detection of the operation of a manually-operable control of at least one of the first and second personal portable devices.

14. The method of claim 9, wherein:
the first requirements data indicates a capability required to execute the first task routine, the indication being selected from the group consisting of an indication of an amount of storage, an indication of a level of processor throughput, an indication of a level of network throughput, and an indication of a user interaction capability; and
the second requirements data indicates a capability required to execute the second task routine, the indication being selected from the group consisting of an indication of an amount of storage, an indication of a level of processor throughput, an indication of a level of network throughput, and an indication of a user interaction capability.

15. The method of claim 9, wherein:
the first capabilities data indicates a capability available from the first personal portable device, the indication being selected from the group consisting of an indication of an amount of storage within the first personal portable device, an indication of a level of processor throughput of the first processor, an indication of a level of network throughput of the first personal portable device on the wireless network, and an indication of a user interaction capability of the first personal portable device; and
the second capabilities data indicates a capability available from the second personal portable device, the indication being selected from the group consisting of an indication of an amount of storage within the second personal portable device, an indication of a level of processor throughput of the second processor, an indication of a level of network throughput of the second personal portable device on the wireless network, and an indication of a user interaction capability of the second personal portable device.

16. The method of claim 9, wherein comparing the first requirements data to the first and second capabilities data comprises comparing requirements to execute the first task routine to capabilities of the first and second personal portable devices to execute routines, and wherein comparing the second requirements data to the first and second capabilities data comprises comparing requirements to execute the second task routine to capabilities of the first and second personal portable devices to execute routines.

17. The method of claim 9, wherein deriving the first distribution comprises determining which one of the first and second personal portable devices stores a task data required to perform the task.

18. The method of claim 9, wherein the first distribution requires that at least one of the first and second task routines be copied between the first and second personal portable devices, and wherein deriving the first distribution comprises determining whether at least one of the first and second task routines is compatible with at least one of the first and second processors.

19. The method of claim 9, further comprising:
transmitting a first audio data between the first and second personal portable devices in performing the first task portion; and
audibly outputting at least a first portion of the first audio data in performing the second task portion.

20. The method of claim 19, wherein:
the first and second personal portable devices cooperate with a third personal portable device through the wireless network to perform the task;
the wireless network is of a chain topography wherein the third personal portable devices occupies an endpoint of the chain topography; and
the method further comprises:
retransmitting at least a second portion of the first audio to the third personal portable device through the wireless network in performing a third task portion of the task to enable the third personal portable device to audibly output the at least a second portion of the first audio; and
retrieving a third requirements data indicating a capability required to perform the third task portion, and a third capabilities data indicating a capability of the third personal portable device.

21. The method of claim 19, wherein:
the first and second personal portable devices cooperate with a third personal portable device through the wireless network to perform the task;
the wireless network is of a chain topography wherein the third personal portable devices occupies an endpoint of the chain topography; and
the method further comprises:
retransmitting the at least a first portion of the first audio to the third personal portable device through the wireless network in performing a third task portion of the task to enable the third personal portable device to audibly output the at least a first portion of the first audio;
transmitting at least a portion of a second audio detected by a microphone of the second personal portable device to the first personal portable device through the wireless network in performing a fourth task portion of the task;
retrieving a third requirements data indicating a capability required to perform the third task portion, a fourth requirements data indicating a capability required to perform the fourth task portion, and a third capabilities data indicating a capability of the third personal portable device.

22. A first personal portable device to cooperate with at least a second personal portable device through a wireless network to perform a task comprising a plurality of task portions, the first personal portable device comprising:
a first wireless transceiver to enable communications across the wireless network with the second personal portable device;
a first processor;
a first storage in which is stored a first assignment routine comprising a sequence of instructions, that when executed by the first processor, causes the first processor to:
retrieve a first requirements data indicating a capability required to execute a first task routine to perform a first task portion of the plurality of task portions, a second requirements data indicating a capability required to execute a second task routine to perform a second task portion of the plurality of task portions, and a first capabilities data indicating a capability of the first personal portable device to execute a routine;

operate the first wireless transceiver to signal the second personal portable device through the wireless network to retrieve a second capabilities data indicating a capability of the second personal portable device to execute a routine;

derive a first distribution of assignments of performances of the first and second task portions among the first and second personal portable devices in response to comparing the first requirements data to the first and second capabilities data and in response to comparing the second requirements data to the first and second capabilities data, wherein the first task portion is assigned to be performed by the first personal portable device such that the first processor is assigned to execute the first routine and the second task portion is assigned to be performed by the second personal portable device such that a second processor of the second personal portable device is assigned to execute the second routine; and operate the first wireless transceiver to signal the second personal portable device through the wireless network with an indication that the second personal portable device is assigned to execute the second task routine; and wherein the first distribution requires that at least one of the first and second task routines transferred between the first storage of the first personal portable device and a second storage of the second personal portable device, and wherein the first processor being caused to derive the first distribution comprises the first processor being caused to determine whether transferring at least one of the first and second task routines between the first and second storages is permissible.

23. The first personal portable device of claim 22, wherein the first capabilities data indicates a degree to which the capability of the first personal portable device remains available for executing a routine as a result of the capability of the first personal portable device being at least partly utilized in the execution of a routine of another task.

24. The first personal portable device of claim 23, wherein executing the first assignment routine further causes the first processor to:

detect a change in the degree to which the capability of the first personal portable device remains available; and derive a second distribution of assignments of performance of the first and second task portions among the first and second personal portable devices in response to the change in the degree to which the capability of the first personal portable device remains available.

25. The first personal portable device of claim 22, further comprising a first interactive component having a manually-operable control to enable a user of at least the first and second personal portable devices to enable a user to signal for at least the first and second personal portable devices to cooperate to perform the task.

26. The first personal portable device of claim 22, wherein:

the capability indicated by the first requirements data is selected from the group consisting of an indication of an amount of storage, an indication of a level of processor throughput, an indication of a level of network throughput, and an indication of a user interaction capability; and the capability indicated by the second requirements data is selected from the group consisting of an indication of an amount of storage, an indication of a level of processor throughput, an indication of a level of network throughput, and an indication of a user interaction capability.

27. The first personal portable device of claim 22, wherein:

the capability available indicated by the first capabilities data is selected from the group consisting of an indication of an amount of storage within the first personal portable device, an indication of a level of processor throughput of the first processor, an indication of a level of network throughput of the first personal portable device on the wireless network, and an indication of a user interaction capability of the first personal portable device; and the capability available indicated by the second capabilities data is selected from the group consisting of an indication of an amount of storage within the second personal portable device, an indication of a level of processor throughput of the second processor, an indication of a level of network throughput of the second personal portable device on the wireless network, and an indication of a user interaction capability of the second personal portable device.

28. The first personal portable device of claim 22, wherein the first processor being caused to derive the first distribution comprises the first processing being caused to determine which one of the first and second personal portable devices stores a task data required to perform the task.

29. The first personal portable device of claim 22, wherein the first distribution requires that at least one of the first and second task routines be copied between the first storage of the first personal portable device and a second storage of the second personal portable device, and wherein the first processor being caused to derive the first distribution comprises the first processor being caused to determine whether at least one of the first and second task routines is compatible with at least one of the first and second processors.

30. A method of distributing a first task portion and a second task portion of a task among a first personal portable device and a second personal portable device, the method comprising:

awaiting an indication from an operator of the first and second personal portable devices for the first and second personal portable devices to cooperate through a wireless network to perform the task;

retrieving a first requirements data indicating a capability required to perform the first task portion, a second requirements data indicating a capability required to perform the second task portion, a first capabilities data indicating a capability of the first personal portable device, and a second capabilities data indicating a capability of the second personal portable device;

deriving a first distribution of assignments of performances of the first and second task portions among the first and second personal portable devices in response to comparing the first requirements data to the first and second capabilities data and in response to comparing the second requirements data to the first and second capabilities data, wherein the first task portion is assigned to be performed by the first personal portable device and the second task portion is assigned to be performed by the second personal portable device;

transmitting a signal from one of the first and second personal portable devices with an indication of the first distribution of assignments to the other of the first and second personal portable devices through the wireless network; and wherein:
the first personal portable device performing the first task portion comprises a first processor of the first personal portable device retrieving a first task routine corresponding to the first task portion from a storage accessible to the first processor and executing the first task routine;
the second personal portable device performing the second task portion comprises a second processor of the second personal portable device retrieving a second task routine corresponding to the second task portion from a storage accessible to the second processor and executing the second task routine; and
the first distribution requires that at least one of the first and second task routines be transferred between the first and second personal portable devices, and wherein deriving the first distribution comprises determining whether transferring at least one of the first and second task routines between the first and second personal portable devices is permissible.

31. The method of claim 30, further comprising retrieving at least one of the first and second requirements data and at least one of the first and second capabilities data from at least one of the first and second personal portable devices through the wireless network.

32. The method of claim 30, wherein the first capabilities data indicates a degree to which the capability of the first personal portable device remains available for performing the task as a result of the capability of the first personal portable device being at least partly utilized in performing another task.

33. The method of claim 32, further comprising:
detecting a change in the degree to which the capability of the first personal portable device remains available for performing the task; and
deriving a second distribution of assignments of performance of the first and second task portions among the first and second personal portable devices in response to the change in the degree to which the capability of the first personal portable device remains available.

34. The method of claim 30, wherein awaiting an indication from an operator comprises awaiting detection of the operation of a manually-operable control of at least one of the first and second personal portable devices.

35. The method of claim 30, wherein:
the first requirements data indicates a capability required to execute the first task routine, the indication being selected from the group consisting of an indication of an amount of storage, an indication of a level of processor throughput, an indication of a level of network throughput, and an indication of a user interaction capability; and
the second requirements data indicates a capability required to execute the second task routine, the indication being selected from the group consisting of an indication of an amount of storage, an indication of a level of processor throughput, an indication of a level of network throughput, and an indication of a user interaction capability.

36. The method of claim 30, wherein:
the first capabilities data indicates a capability available from the first personal portable device, the indication being selected from the group consisting of an indication of an amount of storage within the first personal portable device, an indication of a level of processor throughput of the first processor, an indication of a level of network throughput of the first personal portable device on the wireless network, and an indication of a user interaction capability of the first personal portable device; and
the second capabilities data indicates a capability available from the second personal portable device, the indication being selected from the group consisting of an indication of an amount of storage within the second personal portable device, an indication of a level of processor throughput of the second processor, an indication of a level of network throughput of the second personal portable device on the wireless network, and an indication of a user interaction capability of the second personal portable device.

37. The method of claim 30, wherein comparing the first requirements data to the first and second capabilities data comprises comparing requirements to execute the first task routine to capabilities of the first and second personal portable devices to execute routines, and wherein comparing the second requirements data to the first and second capabilities data comprises comparing requirements to execute the second task routine to capabilities of the first and second personal portable devices to execute routines.

38. The method of claim 30, wherein deriving the first distribution comprises determining which one of the first and second personal portable devices stores a task data required to perform the task.

39. The method of claim 30, wherein the first distribution requires that at least one of the first and second task routines be copied between the first and second personal portable devices, and wherein deriving the first distribution comprises determining whether at least one of the first and second task routines is compatible with at least one of the first and second processors.

40. The method of claim 30, further comprising:
transmitting a first audio data between the first and second personal portable devices in performing the first task portion; and
audibly outputting at least a first portion of the first audio data in performing the second task portion.

41. The method of claim 40, wherein:
the first and second personal portable devices cooperate with a third personal portable device through the wireless network to perform the task;
the wireless network is of a chain topography wherein the third personal portable devices occupies an endpoint of the chain topography; and
the method further comprises:
retransmitting at least a second portion of the first audio to the third personal portable device through the wireless network in performing a third task portion of the task to enable the third personal portable device to audibly output the at least a second portion of the first audio; and
retrieving a third requirements data indicating a capability required to perform the third task portion, and a third capabilities data indicating a capability of the third personal portable device.

42. The method of claim 40, wherein:
the first and second personal portable devices cooperate with a third personal portable device through the wireless network to perform the task;
the wireless network is of a chain topography wherein the third personal portable devices occupies an endpoint of the chain topography; and
the method further comprises:
retransmitting the at least a first portion of the first audio to the third personal portable device through the wireless network in performing a third task portion of the task to enable the third personal portable device to audibly output the at least a first portion of the first audio;

transmitting at least a portion of a second audio detected by a microphone of the second personal portable device to the first personal portable device through the wireless network in performing a fourth task portion of the task;

retrieving a third requirements data indicating a capability required to perform the third task portion, a fourth requirements data indicating a capability required to perform the fourth task portion, and a third capabilities data indicating a capability of the third personal portable device.

* * * * *